US012802094B2

(12) United States Patent
Chen et al.

(10) Patent No.: US 12,802,094 B2
(45) Date of Patent: Nov. 17, 2026

(54) DIGITAL TWINS FOR SIMULATED EXPERIMENTATION

(71) Applicant: FMR LLC, Boston, MA (US)

(72) Inventors: Zitian Chen, Charlotte, NC (US); Yechao Zhu, Quincy, MA (US); Wei-Tng Chiu, Brookline, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/930,342

(22) Filed: Oct. 29, 2024

(65) Prior Publication Data

US 2026/0120137 A1 Apr. 30, 2026

(51) Int. Cl.
*G06Q 30/0204* (2023.01)
*G06Q 30/0201* (2023.01)

(52) U.S. Cl.
CPC ................................ *G06Q 30/0204* (2013.01)

(58) Field of Classification Search
None
See application file for complete search history.

(56) References Cited

U.S. PATENT DOCUMENTS

2021/0342836 A1* 11/2021 Cella ...................... G06N 20/00
2023/0068767 A1* 3/2023 Rakshit .................. G16H 40/67
2025/0227078 A1* 7/2025 Dong ...................... G06F 40/35

OTHER PUBLICATIONS

Dmytro Adamenkoa; Review and comparison of the methods of designing the Digital Twin; Dmytro Adamenko et al. / Procedia CIRP 91 (2020); Elsevier; pp. 27-32 (Year: 2020).*
Ben-Michael, et al., The Augmented Synthetic Control Method, 2021, pp. 1789-1803, vol. 116, No. 536, Journal of the American Statistical Association.
Amjad, et al., Robust Synthetic Control, 2018, pp. 802-852, vol. 19, No. 1, The Journal of Machine Learning Research.
Abadie, A. & L'hour, J., A Penalized Synthetic Control Estimator for Disaggregated Data, , 2021, pp. 1817-1834, vol. 116, No. 536, Journal of the American Statistical Association.
Abadie, et al., Comparative Politics and The Synthetic Control Method, 2015, pp. 495-510 , vol. 59, No. 2, American Journal of Political Science.

* cited by examiner

*Primary Examiner* — Ann J Lo
*Assistant Examiner* — Jermaine A Mincey
(74) *Attorney, Agent, or Firm* — Cesari and McKenna, LLP

(57) ABSTRACT

A computerized method is provided for generating digital twins from customer data in order to test hypotheses and analyze customer outcomes. Digital twins, created on an individual customer basis, can accurately predict the impact of various customer experiences on different measures of customer outcomes. Parallel computing and efficient matching algorithms allow for reduced costs and greater availability for customer outcome analysis.

19 Claims, 32 Drawing Sheets

201

FIG. 6
Now let's formulate your hypothesis based on the data:
Select Treatment
What is your treatment indicator (1 if treated by any treatment event, 0 else)?
new_experience
Outcome Metric(s)
Outcome set #1
Outcome set #2

FIG. 8
Main Analysis: Synthetic Control Method (SCM)
Below you can see examples of treated individuals and their synthetic controls

Click for how 'exact' was the matching between the treated and the synthetic controls?

Based on the threshold you set up for Table 2B, the matching was very 'exact'.

Table 3B. A Comparison between the Treatment and Synthetic Control Groups in Pre-treatment Covariates and Outcome Metric(s)

Numeric and binary covariates:

| | Variable name | Mean (treatment) | Mean (control) | Mean diff | % of mean diff to mean (control) | Confidence in equal means (%) | STD (treatment) | STD (control) | Confidence in equal STD (%) |
|---|---|---|---|---|---|---|---|---|---|
| 0 | money_transfer_90days_pre | 18,954.816 | 18,205.093 | 749.723 | 4.118 | 7.200 | 56,525.976 | 56,282.502 | 88.800 |
| 1 | money_transfer_60days_pre | 18,740.703 | 17,980.114 | 760.589 | 4.230 | 9.400 | 56,505.588 | 54,954.425 | 88.400 |
| 2 | money_transfer_30days_pre | 18,854.088 | 17,996.031 | 858.057 | 4.768 | 2.800 | 56,744.779 | 55,012.945 | 87.800 |
| 3 | trades_90days_pre | 219.846 | 220.571 | -0.725 | -0.329 | 69.600 | 439.465 | 436.107 | 95.600 |
| 4 | trades_60days_pre | 220.594 | 217.979 | 2.615 | 1.200 | 14.200 | 442.721 | 431.883 | 88.800 |
| 5 | trades_30days_pre | 222.430 | 221.245 | 1.185 | 0.534 | 48.200 | 444.708 | 437.848 | 91.800 |
| 6 | tenure_years | 16.235 | 16.343 | -0.108 | -0.660 | 10.800 | 16.247 | 16.012 | 73.500 |
| 7 | age | 61.037 | 60.985 | 0.049 | 0.080 | 50.800 | 15.249 | 14.850 | 78.500 |

FIG. 9

*Note: Lines for the mean values and the shades for the 95% confidence interval.*

```
from sklearn.metrics import r2_score
def r2_mean(df0, df1, feature_list):
    r2s = []
    for f in feature_list:
        dmin = min(df0[f].min(), df1[f].min())
        dmax = max(df0[f].max(), df1[f].max())
        df0s = (df0[f] - dmin)/(dmax - dmin)
        df1s = (df1[f] - dmin)/(dmax - dmin)
        r2 = r2_score(df0s, df1s)
        r2s.append(r2)
    r2_mean = np.mean(r2s)
    return r2_mean
```

FIG. 12

Lift (%) calculation based on different match-and-compare approaches

| Outcome | NEW_MONEY | DIGITAL_VISIT | TRADES | Time cost | R2 |
|---|---|---|---|---|---|
| Raw | -139.162 | -27.480 | -357.181 | 0 secs | NaN |
| 1NN (pytorch) | -6.040 | -8.963 | -202.898 | 1 mins 27 secs | 0.161 |
| PSM | 3.897 | -5.143 | -70.123 | 27 secs | -0.689 |
| PSMX | -32.092 | 5.928 | -13.173 | 30 secs | -0.168 |
| PSMRF | -13.173 | -172.968 | -172.968 | 27 secs | -0.378 |
| DAME | -12.751 | 4.527 | -17.735 | 1 mins 46 secs | 0.391 |
| FLAME | -17.735 | -102.073 | -1774.241 | 1 mins 23 secs | -1.332 |
| SCM | 4.476 | 6.166 | -9.856 | 7 mins 43 secs | 0.962 |
| RASCM | -28.134 | 5.913 | -37.128 | 2 mins 39 secs | 0.919 |
| LASCM | 6.160 | 5.815 | -8.834 | 14 mins 9 secs | 0.973 |
| PSCM | 15.684 | 6.813 | -14.945 | 8 mins 15 secs | 0.961 |

FIG. 13

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 2061.609 | 2300.594 | 52.739 | 0.000 | 23720.833 | 19113.539 | 4607.294 | 0.000 |
| 4 | DIGITAL_VISIT_PRE | 7.401 | 2.485 | 4.916 | 66.420 | 0.000 | 7.741 | 4.962 | 2.778 | 0.000 |
| 5 | TRADES_PRE | 7.158 | 1.381 | 5.776 | 80.699 | 0.000 | 46.336 | 30.225 | 16.111 | 0.000 |
| 6 | AGE | 45.993 | 48.262 | -2.269 | -4.934 | 0.000 | 16.484 | 16.999 | -0.515 | 0.067 |
| 7 | TOTBAL_AMT_JUN | 232258.514 | 158472.779 | 73785.735 | 31.769 | 0.000 | 837296.837 | 883011.010 | -45714.173 | 0.000 |
| 8 | TRADES_COMM_R12 | 78.988 | 14.276 | 64.712 | 81.926 | 0.000 | 552.748 | 361.909 | 190.839 | 0.000 |
| 9 | SERVICE_PREMIUM | 0.054 | 0.056 | -0.001 | -1.769 | 0.737 | 0.246 | 0.248 | -0.002 | 0.737 |

```
Lift in NEW_MONEY: -139.1619%
Lift in DIGITAL_VISIT: -27.48%
Lift in TRADES: -357.181%
Total time taken: 0 secs
```

FIG. 14

| | variables | mean treated | mean control | mean diff | mean diff (%)* | p-value (mean diff~0) | std treated | std control | std diff* | p-value (std diff~0) |
|---|---|---|---|---|---|---|---|---|---|---|
| 3 | NEW_MONEY_PRE | 4362.203 | 4011.867 | 350.336 | 8.031 | 0.017 | 23720.833 | 16698.049 | 7022.785 | 0.375 |
| 4 | DIGITAL_VISIT_PRE | 7.401 | 4.154 | 3.247 | 43.868 | 0.000 | 7.741 | 6.113 | 1.627 | 0.000 |
| 5 | TRADES_PRE | 7.158 | 2.167 | 4.991 | 69.731 | 0.000 | 46.336 | 13.659 | 32.677 | 0.000 |
| 6 | AGE | 45.993 | 49.086 | -3.093 | -6.725 | 0.000 | 16.484 | 16.186 | 0.298 | 0.160 |
| 7 | TOTBAL_AMT_JUN | 232258.514 | 232069.712 | 188.802 | 0.081 | 0.612 | 837296.837 | 821867.855 | 15428.982 | 0.991 |
| 8 | TRADES_COMM_R12 | 78.988 | 21.437 | 57.552 | 72.861 | 0.000 | 552.748 | 160.683 | 392.065 | 0.000 |
| 9 | SERVICE_PREMIUM | 0.064 | 0.115 | -0.050 | -77.901 | 0.000 | 0.246 | 0.319 | -0.073 | 0.000 |

```
Lift in NEW_MONEY: -6.0399%
Lift in DIGITAL_VISIT: -8.9634%
Lift in TRADES: -202.8982%
Total time taken: 1 mins 27 secs
R2 = 0.16082018567617132
```

FIG. 15

| | variables | mean treated | mean control | mean diff | mean diff (%)^ | p-value (mean diff=0) | std treated | std control | std diff* | p-value (std diff=0) |
|---|---|---|---|---|---|---|---|---|---|---|
| 3 | NEW_MONEY_PRE | 4362.203 | 4375.791 | -13.588 | -0.311 | 0.983 | 23720.833 | 44482.300 | -20761.467 | 0.883 |
| 4 | DIGITAL_VISIT_PRE | 7.401 | 4.212 | 3.189 | 43.084 | 0.000 | 7.741 | 6.201 | 1.539 | 0.000 |
| 5 | TRADES_PRE | 7.158 | 3.867 | 3.290 | 45.971 | 0.000 | 46.336 | 41.219 | 5.117 | 0.000 |
| 6 | AGE | 45.993 | 45.879 | 0.113 | 0.246 | 0.013 | 16.484 | 16.467 | 0.017 | 0.600 |
| 7 | TOTBAL_AMT_JUN | 232258.514 | 258350.432 | -26091.918 | -11.234 | 0.157 | 837296.837 | 1367600.735 | -530303.898 | 0.087 |
| 8 | TRADES_COMM_R12 | 78.988 | 42.653 | 36.335 | 46.001 | 0.000 | 552.748 | 493.284 | 59.464 | 0.000 |
| 9 | SERVICE_PREMIUM | 0.064 | 0.084 | -0.020 | -30.663 | 0.000 | 0.246 | 0.278 | -0.032 | 0.000 |

```
Lift in NEW_MONEY: 3.8973%
Lift in DIGITAL_VISIT: -5.1433%
Lift in TRADES: -70.1233%
Total time taken: 27 secs
R2 = -0.688905942447888
```

FIG. 16

| | variables | mean treated | mean control | mean diff | mean diff (%)^ | p-value (mean diff=0) | std treated | std control | std diff^ | p-value (std diff=0) |
|---|---|---|---|---|---|---|---|---|---|---|
| 3 | NEW_MONEY_PRE | 4362.203 | 3645.062 | 717.141 | 16.440 | 0.080 | 23720.833 | 20358.622 | 3362.011 | 0.083 |
| 4 | DIGITAL_VISIT_PRE | 7.401 | 7.337 | 0.064 | 0.858 | 0.457 | 7.741 | 7.659 | 0.082 | 0.449 |
| 5 | TRADES_PRE | 7.158 | 6.212 | 0.945 | 13.208 | 0.189 | 46.336 | 34.151 | 12.185 | 0.219 |
| 6 | AGE | 45.993 | 45.220 | 0.773 | 1.680 | 0.000 | 16.484 | 16.561 | -0.077 | 0.840 |
| 7 | TOTBAL_AMT_JUN | 232258.514 | 184540.025 | 47718.489 | 20.545 | 0.000 | 837296.837 | 480625.418 | 356671.419 | 0.000 |
| 8 | TRADES_COMM_R12 | 78.989 | 67.734 | 11.254 | 14.248 | 0.191 | 552.748 | 407.168 | 145.580 | 0.218 |
| 9 | SERVICE_PREMIUM | 0.064 | 0.052 | 0.012 | 18.785 | 0.000 | 0.246 | 0.223 | 0.023 | 0.006 |

```
Lift in NEW_MONEY: -32.0917%
Lift in DIGITAL_VISIT: 5.9285%
Lift in TRADES: -13.1732%
Total time taken: 30 secs
R2 = -0.16780549479379234
```

FIG. 17

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 0.000 | 4362.203 | 100.000 | 0.000 | 23720.833 | 0.000 | 23720.833 | 0.000 |
| 4 | DIGITAL_VISIT_PRE | 7.401 | 0.416 | 6.985 | 94.380 | 0.000 | 7.741 | 0.033 | 7.707 | 0.000 |
| 5 | TRADES_PRE | 7.158 | 0.000 | 7.158 | 100.000 | 0.000 | 46.336 | 0.000 | 46.336 | 0.000 |
| 6 | AGE | 45.993 | 25.089 | 20.903 | 45.449 | 0.000 | 16.484 | 1.153 | 15.331 | 0.000 |
| 7 | TOTBAL_AMT_JUN | 232258.514 | 0.000 | 232258.514 | 100.000 | 0.000 | 837296.837 | 0.000 | 837296.837 | 0.000 |
| 8 | TRADES_COMM_R12 | 78.988 | 0.000 | 78.988 | 100.000 | 0.000 | 552.748 | 0.000 | 552.748 | 0.000 |
| 9 | SERVICE_PREMIUM | 0.064 | 0.000 | 0.064 | 100.000 | 0.000 | 0.246 | 0.000 | 0.246 | 0.000 |

```
Lift in NEW_MONEY: N/A.
Lift in DIGITAL_VISIT: -172.9682%
Lift in TRADES: N/A.
Total time taken: 27 secs
R2 = -0.37832212494656887
```

FIG. 18

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 4652.137 | -289.934 | -6.647 | 0.307 | 23720.833 | 11650.781 | 12070.052 | 0.420 |
| 4 | DIGITAL_VISIT_PRE | 7.401 | 7.212 | 0.189 | 2.553 | 0.000 | 7.741 | 7.048 | 0.693 | 0.035 |
| 5 | TRADES_PRE | 7.158 | 5.923 | 1.235 | 17.250 | 0.034 | 46.336 | 16.734 | 29.602 | 0.061 |
| 6 | AGE | 45.993 | 46.113 | -0.121 | -0.262 | 0.022 | 16.484 | 16.119 | 0.365 | 0.079 |
| 7 | TOTBAL_AMT_JUN | 232258.514 | 270240.438 | -37981.924 | -16.353 | 0.000 | 837296.837 | 610307.978 | 226988.858 | 0.006 |
| 8 | TRADES_COMM_R12 | 78.988 | 64.768 | 14.220 | 18.003 | 0.041 | 552.748 | 198.112 | 354.636 | 0.068 |
| 9 | SERVICE_PREMIUM | 0.064 | 0.085 | -0.021 | -32.675 | 0.000 | 0.246 | 0.161 | 0.085 | 0.000 |

```
Lift in NEW_MONEY: -12.7512%
Lift in DIGITAL_VISIT: 4.5271%
Lift in TRADES: -17.7348%
Total time taken: 1 mins 46 secs
R2 = 0.3908573663998532
```

FIG. 19

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 0.000 | 4362.203 | 100.000 | 0.000 | 23720.833 | 0.000 | 23720.833 | 0.000 |
| 4 | DIGITAL_VISIT_PRE | 7.401 | 2.720 | 4.681 | 63.251 | 0.000 | 7.741 | 0.000 | 7.741 | 0.000 |
| 5 | TRADES_PRE | 7.158 | 0.341 | 6.817 | 95.237 | 0.000 | 46.336 | 0.000 | 46.336 | 0.000 |
| 6 | AGE | 45.993 | 80.524 | -34.531 | -75.080 | 0.000 | 16.484 | 0.000 | 16.484 | 0.000 |
| 7 | TOTBAL_AMT_JUN | 232258.514 | 909865.969 | -677607.455 | -291.747 | 0.000 | 837296.837 | 0.000 | 837296.837 | 0.000 |
| 8 | TRADES_COMM_R12 | 78.989 | 0.182 | 78.807 | 99.770 | 0.000 | 552.748 | 0.000 | 552.748 | 0.000 |
| 9 | SERVICE_PREMIUM | 0.064 | 0.545 | -0.481 | -748.660 | 0.000 | 0.246 | 0.000 | 0.246 | 0.000 |

```
Lift in NEW_MONEY: N/A.
Lift in DIGITAL_VISIT: -102.0732%
Lift in TRADES: -1774.2406%
Total time taken: 1 mins 23 secs
R2 = -1.3320800999804288
```

FIG. 20

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 4016.581 | 345.622 | 7.923 | 0.000 | 23720.833 | 21670.210 | 2050.623 | 0.334 |
| 4 | DIGITAL_VISIT_PRE | 7.401 | 7.399 | 0.002 | 0.028 | 0.003 | 7.741 | 7.737 | 0.004 | 0.988 |
| 5 | TRADES_PRE | 7.158 | 6.184 | 0.974 | 13.604 | 0.000 | 46.336 | 37.681 | 8.655 | 0.179 |
| 6 | AGE | 45.993 | 46.001 | -0.009 | -0.019 | 0.000 | 16.484 | 16.479 | 0.005 | 0.987 |
| 7 | TOTBAL_AMT_JUN | 232258.514 | 220887.500 | 11371.014 | 4.896 | 0.000 | 837296.837 | 774065.755 | 63231.082 | 0.403 |
| 8 | TRADES_COMM_R12 | 78.988 | 68.670 | 10.318 | 13.063 | 0.000 | 552.748 | 449.660 | 103.088 | 0.233 |
| 9 | SERVICE_PREMIUM | 0.064 | 0.064 | 0.000 | 0.000 | 0.524 | 0.246 | 0.246 | 0.000 | 1.000 |

```
Lift in NEW_MONEY: 4.4755%
Lift in DIGITAL_VISIT: 6.1658%
Lift in TRADES: -9.856%
Total time taken: 7 mins 43 secs
R2 = 0.9619140938634873
```

FIG. 21

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 3083.728 | 1278.475 | 29.308 | 0.000 | 23720.833 | 20077.316 | 3643.517 | 0.000 |
| 4 | DIGITAL_VISIT_PRE | 7.401 | 7.386 | 0.015 | 0.198 | 0.000 | 7.741 | 7.736 | 0.005 | 1.000 |
| 5 | TRADES_PRE | 7.158 | 4.948 | 2.209 | 30.866 | 0.000 | 46.336 | 32.261 | 14.075 | 0.001 |
| 6 | AGE | 45.993 | 46.010 | -0.017 | -0.037 | 0.000 | 16.484 | 16.421 | 0.063 | 0.627 |
| 7 | TOTBAL_AMT_JUN | 232258.514 | 191892.021 | 40366.493 | 17.380 | 0.000 | 837296.837 | 689758.589 | 147538.248 | 0.001 |
| 8 | TRADES_COMM_R12 | 78.988 | 54.423 | 24.566 | 31.100 | 0.000 | 552.748 | 385.064 | 167.684 | 0.003 |
| 9 | SERVICE_PREMIUM | 0.064 | 0.064 | -0.000 | -0.014 | 0.001 | 0.246 | 0.246 | -0.000 | 0.998 |

```
Lift in NEW_MONEY: -28.134%
Lift in DIGITAL_VISIT: 5.9134%
Lift in TRADES: -37.1257%
Total time taken: 2 mins 39 secs
R2 = 0.9187513753275441
```

FIG. 22

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 3988.662 | 373.541 | 8.563 | 0.000 | 23720.833 | 22080.204 | 1640.629 | 0.362 |
| 4 | DIGITAL_VISIT_PRE | 7.401 | 7.399 | 0.002 | 0.025 | 0.000 | 7.741 | 7.738 | 0.003 | 0.991 |
| 5 | TRADES_PRE | 7.158 | 6.255 | 0.903 | 12.618 | 0.000 | 46.338 | 39.191 | 7.145 | 0.221 |
| 6 | AGE | 45.993 | 45.982 | 0.011 | 0.024 | 0.000 | 16.484 | 16.471 | 0.013 | 0.946 |
| 7 | TOTBAL_AMT_JUN | 232258.514 | 220779.906 | 11478.608 | 4.942 | 0.000 | 837296.837 | 776711.221 | 60585.616 | 0.411 |
| 8 | TRADES_COMM_R12 | 78.988 | 69.573 | 9.415 | 11.920 | 0.000 | 552.749 | 467.963 | 84.786 | 0.284 |
| 9 | SERVICE_PREMIUM | 0.064 | 0.064 | 0.000 | 0.246 | 0.000 | 0.246 | 0.245 | 0.001 | 0.973 |

```
Lift in NEW_MONEY: 6.1602%
Lift in DIGITAL_VISIT: 5.8152%
Lift in TRADES: -8.6343%
Total time taken: 14 mins 9 secs
R2 = 0.9734131405413163
```

FIG. 23

| | variables | mean treated | mean control | mean diff | mean diff (%)* | p-value (mean diff=0) | std treated | std control | std diff* | p-value (std diff=0) |
|---|---|---|---|---|---|---|---|---|---|---|
| 3 | NEW_MONEY_PRE | 4362.203 | 3992.715 | 369.488 | 8.470 | 0.000 | 23720.833 | 21645.622 | 2075.211 | 0.251 |
| 4 | DIGITAL_VISIT_PRE | 7.401 | 7.398 | 0.002 | 0.030 | 0.002 | 7.741 | 7.737 | 0.004 | 0.988 |
| 5 | TRADES_PRE | 7.158 | 5.947 | 1.211 | 16.913 | 0.000 | 46.336 | 37.584 | 8.752 | 0.104 |
| 6 | AGE | 45.993 | 46.002 | -0.009 | -0.020 | 0.000 | 16.484 | 16.478 | 0.007 | 0.985 |
| 7 | TOTBAL_AMT_JUN | 232258.514 | 218831.170 | 13427.344 | 5.781 | 0.000 | 837296.837 | 767437.786 | 69859.051 | 0.317 |
| 8 | TRADES_COMM_R12 | 78.988 | 66.348 | 12.640 | 16.003 | 0.000 | 552.748 | 448.545 | 104.203 | 0.159 |
| 9 | SERVICE_PREMIUM | 0.064 | 0.064 | 0.000 | 0.000 | 0.206 | 0.246 | 0.246 | 0.000 | 1.000 |

```
Lift in NEW_MONEY: 15.684%
Lift in DIGITAL_VISIT: 6.8128%
Lift in TRADES: -14.9451%
Total time taken: 8 mins 15 secs
R2 = 0.9611704068535712
```

FIG. 24

| | NEW_MONEY_PRE | DIGITAL_VISIT_PRE | TRADES_PRE | AGE | TOTBAL_AMT_JUN | TRADES_COMM_R12 | SERVICE_PREMIUM |
|---|---|---|---|---|---|---|---|
| Treated No.1896 | 7135.693 | 3.750 | 0.500 | 51.110 | 452740.450 | 6.000 | 1.000 |
| Ctrl-1NN | 6833.333 | 12.000 | 0.667 | 70.100 | 454403.310 | 0.000 | 0.000 |
| Ctrl-PSM | 88.138 | 0.250 | 0.000 | 50.020 | 160.930 | 0.000 | 0.000 |
| Ctrl-PSMX | 6487.653 | 4.333 | 0.417 | 53.020 | 489165.510 | 4.000 | 1.000 |
| Ctrl-PSMRF | 0.000 | 0.417 | 0.000 | 25.050 | 0.000 | 0.000 | 0.000 |
| Ctrl-DAME | 28399.306 | 3.048 | 0.381 | 48.781 | 732091.784 | 4.429 | 1.000 |
| Ctrl-FLAME | 0.000 | 2.720 | 0.341 | 80.524 | 909865.969 | 0.182 | 0.545 |
| Ctrl-SCM | 7135.642 | 3.750 | 0.702 | 51.110 | 452747.666 | 5.587 | 1.000 |
| Ctrl-RASCM | 7696.863 | 3.706 | 1.614 | 51.190 | 478366.542 | 13.341 | 1.000 |
| Ctrl-LASCM | 7135.696 | 3.750 | 0.595 | 51.110 | 452740.220 | 6.009 | 0.997 |
| Ctrl-PSCM | 6874.361 | 3.749 | 2.129 | 51.109 | 439812.877 | 22.034 | 1.000 |

FIG. 25

Age

SERVICE_PREMIUM

DIGITAL TWINS FOR SIMULATED EXPERIMENTATION

TECHNICAL FIELD

This application relates generally to systems, methods, and apparatuses, including computer program products, for creating and using digital twins from customer data for experimentation including estimating the causal impact of customer experiences on outcomes.

BACKGROUND

Driving and maintaining customer engagement can be essential for business health and growth, especially in client service industries. For example, in a competitive sector such as the financial services industry, in order to attract and retain investment and other clients, it is imperative to provide a positive experience. However, it is difficult to accurately determine what types of experience engender positive client outcomes, especially prospectively. Ideally, randomized controlled experimentation, where a sample of subjects (e.g., customers) was randomly split into alternative experiences (i.e., treatment), is an effective approach to estimating the causal impact of an experience on the outcome (e.g., customer engagement, business success metrics), compared to other alternative experiences. However, it is not a good business practice to randomly force customers into experiences for experimentation and, in some instances, may be unethical. Furthermore, such an approach can be difficult to implement, because it is often costly and time-consuming to set up and analyze the results.

SUMMARY

Systems and methods of the invention address the aforementioned problem by using the existing anonymized observational client data that a business may already by collecting to construct digital twins (a.k.a. synthetic controls) for each subject (e.g., customer). These digital twins can then be subjected to different scenarios of experiences to compare outcomes after the experiences to more accurately estimate their causal impact on client outcomes.

Systems and methods described herein can allow businesses such as financial service providers to utilize customer data to construct digital twins and estimate the causal effects of a customer/investor experience on business outcomes. The described methods save time and reduce costs compared to running traditional randomized control experimentation while also increasing understanding of the impact of various products and experiences on business outcomes. Compared to existing methods, the present invention constitutes a significant improvement by using causality for the analysis as opposed to correlation on which most existing methods are based. Additionally, the systems and methods described here can be presented in an efficient, low cost, easy-to-use format as illustrated in the Examples, allowing more frequent use and greater access to more individuals within the company. Accordingly, more marketing, product, IT, and other decisions can be informed by their potential impact on customer outcomes.

In various embodiments, systems and methods described herein can be directly embedded within client data to give users flexibility to define, edit, and test a hypothesis. For example, a user can test a hypothesis that the causal impact of experience A, compared to experience B, is 10% increase on the business outcomes X, Y, and Z for a typical customer defined by a list of features decided by the user. In certain embodiments, systems and methods herein may utilize state of the art optimization methodology to increase precision and improve removal of selection biases to ensure causality rather than correlation. Another advantage of the present invention is the ability to construct digital twins at the individual level. That is, for each customer, there can be at least one digital twin in a different control or test group where most existing technologies only match at the population or group level.

An additional advantage is the use of parallelized computing in digital twin construction so that the technology can work efficiently for large-scale data like customer information at large financial service providers.

Aspects of the invention can include a computerized method for analyzing customer outcomes. Methods can include receiving, from a database, customer profile data comprising features and customer experiences associated with individual customers; defining, via user input, desired features from the customer profile data and a hypothesis to be tested, wherein the hypothesis comprises a customer outcome for a predefined customer experience; dividing individual customers into a treated group consisting of individual customers having the desired features and having received the predefined customer experience and an untreated group consisting of individual customers having the desired features and having not received the predefined customer experience; using one or more optimizers to construct a digital twin in the untreated group for each customer in the treated group by minimizing the sum of pairwise differences between each customer in the treated group and their digital twin in the untreated group across all dimensions of the desired features; and comparing outcomes between customers in the treated group and their digital twins in the untreated group to determine a lift measure of a causal impact of the predefined customer experience, compared to one or more alternative experiences, on outcomes for customers receiving the predefined customer experience.

In various embodiments, constructing the digital twin in the untreated group for each customer in the treated group can further comprise dividing the customers in the treated group into a number of parallel subsamples; using customers in the untreated group as a shared pool of raw data for constructing the digital twins; running, for each customer in each of the parallel subsamples, an optimization to identify weights for a maximum of 100 potentially similar customers from the untreated group; and generating a single index new customer for each customer in each of the parallel subsamples as a digital twin for that customer, wherein the single index new customer is assigned values for each of the desired features that are a weighted average of each of the desired features among the 100 potentially similar customers from the untreated group. The running and generating steps can comprise encoding any categorical features into a list of binary values. The generating step can further comprise assigning to the single index new customer a value for each categorical feature consisting of the binary value that received the highest weighted average.

In certain embodiments, the comparing step can further comprise using the weights identified in the running step in determining the lift measure. Methods can include assigning each parallel subsample to a different processor before the running step. Methods may further comprise copying the shared pool of raw data into a shared memory or memory-mapped file to allow each of the different processors to access the shared pool of raw data simultaneously. In some embodiments, methods can further include recombining all pairs of customers in each of the parallel subsamples and their respective digital twins from the different processors through a memory-mapped file into a single sample for use in the comparing step.

Methods of the invention can further comprise identifying the 100 potentially similar customers from the untreated group using a PyTorch-based 100-nearest neighbor (100NN) method. In some embodiments, the untreated group can comprise individual customers receiving a plurality of different customer experiences and methods can include using the one or more optimizers to construct a digital twin for each of the plurality of different customer experiences in the untreated group for each customer in the treated group; and comparing outcomes between customers in the treated group and their digital twins in each of the plurality of different customer experiences to determine the lift measure of the causal impact of the predefined customer experience, compared to each of the different customer experiences, on the outcomes for customers receiving the predefined customer experience. The features can comprise data about individual customer's profiles, behaviors, or their financial outcomes prior to and after a customer experience.

In various embodiments, methods can further comprise removing any personally identifiable information from the features. The hypothesis to be tested can include a predicted lift measure for customers having the desired features and receiving the predefined customer experience versus another customer experience. The one or more optimizers can comprise regularized weighted quadratic programming.

In certain aspects, systems of the invention can include a computer system for analyzing customer outcomes, the system comprising a processor in communication with a non-transient memory. Systems can be operable to perform the steps of receiving, from a database, customer profile data comprising features and customer experiences associated with individual customers; defining, via user input, desired features from the customer profile data and a hypothesis to be tested, wherein the hypothesis comprises a customer outcome for a predefined customer experience; dividing individual customers into a treated group consisting of individual customers having the desired features and having received the predefined customer experience and an untreated group consisting of individual customers having the desired features and having not received the predefined customer experience; using one or more optimizers to construct a digital twin in the untreated group for each customer in the treated group by minimizing the sum of pairwise differences between each customer in the treated group and their digital twin in the untreated group across all dimensions of the desired features; and comparing outcomes between customers in the treated group and their digital twins in the untreated group to determine a lift measure of a causal impact of the predefined customer experience, compared to other experiences, on the outcomes for customers receiving the predefined customer experience.

In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 9 illustrates an exemplary user interface reporting matching accuracy between digital twins.

FIG. 12 shows a formula used in calculating a mean R2-score as part of a performance metric analysis for various causal inference methods.

FIG. 13 displays exemplary lift calculation results based on different match and compare approaches.

FIG. 14 shows raw data used in the analysis in Example 2.

FIG. 15 shows results comparing treated groups and synthetic control groups after INN matching using PyTorch.

FIG. 16 shows results comparing treated groups and synthetic control groups after propensity score matching (PSM) with p-scores calculated using a logistic regressor.

FIG. 17 shows results comparing treated groups and synthetic control groups after PSM matching with p-scores calculated using an XGBoost classifier (PSMX).

FIG. 18 shows results comparing treated groups and synthetic control groups after PSM matching with p-scores calculated using a random forest classifier (PSMRF).

FIG. 19 shows results comparing treated groups and synthetic control groups after DAME matching.

FIG. 20 shows results comparing treated groups and synthetic control groups after FLAME matching.

FIG. 21 shows results comparing treated groups and synthetic control groups after SCM matching.

FIG. 22 shows results comparing treated groups and synthetic control groups after RASCM matching.

FIG. 23 shows results comparing treated groups and synthetic control groups after LASCM matching.

FIG. 24 shows results comparing treated groups and synthetic control groups after PSCM matching.

FIG. 25 shows results comparing a random customer and their control matched by various methods.

DETAILED DESCRIPTION

Figure 1:
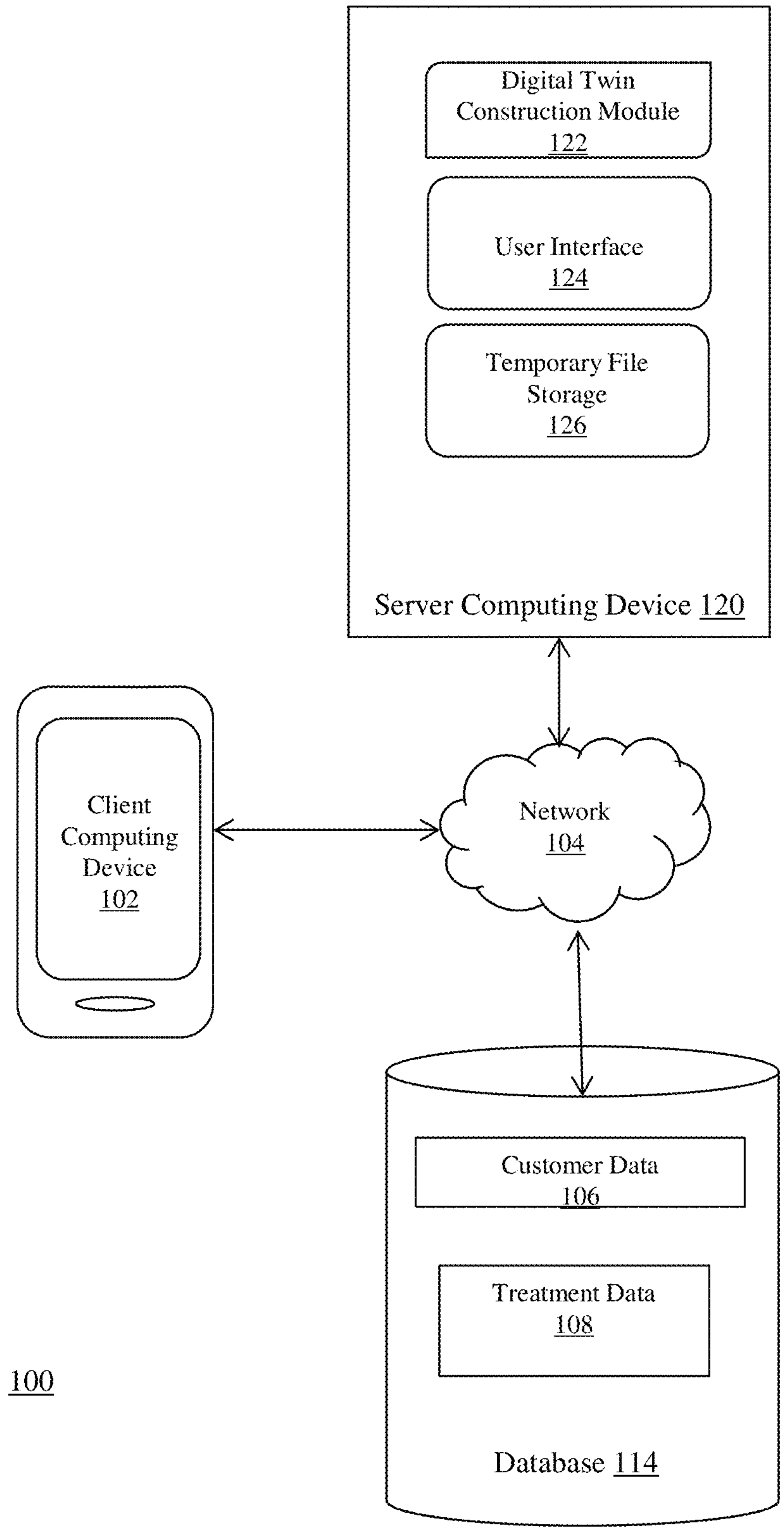
FIG. 1 is a block diagram of a system for analyzing customer outcomes.

FIG. 1 is a block diagram of an exemplary system 100 for analyzing customer outcomes. The system 100 includes a client computing device 102, a communications network 104, a server computing device 120 that includes digital twin construction module 122, a user interface 124, and temporary file storage 126. The system 100 also includes a database 114 storing a client or customer data 106 and predefined treatment data 108.

The client computing device 102 connects to one or more communications networks (e.g., network 104) in order to communicate with the server computing device 120 to provide input and receive output relating to estimating client outcomes based on various hypotheses. Users may interact with the digital twin construction module 122 via a client computing device 102 and the user interface 124. For example, the user interface 124 can be displayed on the client computing device 102 and/or one or more input/output devices can allow the user to identify features of a group to be tested, define customer data, input test hypotheses, monitor progress, and/or view results among other actions.

Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used in conjunction with applications or modules on the server computing device 120. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions (e.g., execute training sessions or review scores). Generally, a browser application comprises software executing on a processor of the client computing device 102 that enables the client computing device to communicate via HTTP or HTTPS with remote servers addressable with URLs (e.g., server computing device 120) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 120 and the database 114 in certain embodiments. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 120 is a device including specialized hardware and/or software modules that execute on a processor and interact with memory modules of the server computing device 120, to receive data from other components of the system 100, transmit data to other components of the system 100, and perform functions (e.g., create digital twins and/or test hypotheses thereon). As discussed above the server computing device 120 includes the digital twin construction module 122, a user interface 124, and temporary file storage 126. The functions of the various modules, programs, or applications are described in more detail below. The server computing device may include any number of other programs that may execute on the processor of the server computing device 120 and may each, despite being disparate programs, rely on a regular exchange of data between them and/or the database 114. In some embodiments, the various modules, programs, or applications are specialized sets of computer software instructions programmed onto one or more dedicated processors in the server computing device 120 and can include specifically designated memory locations and/or registers for executing the specialized computer software instructions.

Although the applications and modules are shown in FIG. 1 as executing within the same server computing device 120, in some embodiments the functionality of the applications and modules can be distributed among a plurality of server computing devices. It should be appreciated that any number of computing devices, arranged in a variety of architectures, resources, and configurations (e.g., cluster computing, virtual computing, cloud computing) can be used without departing from the scope of the invention. The exemplary functionality of the applications, programs, and/or modules is described in detail throughout this specification. In preferred embodiments, computerized systems and methods of the invention rely on a plurality of processors, in a client computing device 102 and/or various distributed server computing devices 120 or other devices in order to efficiently execute steps of the method through parallel computing.

The database 114 is a computing device (or in some embodiments, a set of computing devices) coupled to the server computing device 120 and is configured to receive, generate, and store specific segments of data relating to customer outcome analysis. In some embodiments, all or a portion of the database 114 can be integrated with the server computing device 120 or be located on a separate computing device or devices. The database 114 can comprise one or more databases configured to store portions of data used by the other components of the system 100, as will be described in greater detail below.

In some embodiments, the database 114 comprises one or more repositories of customer data 106 storing various information related to actual customers. The database 114 can also include treatment data 108 which includes predefined or user-defined details about various treatment options (e.g., marketing campaigns or other customer experiences).

Figure 2:
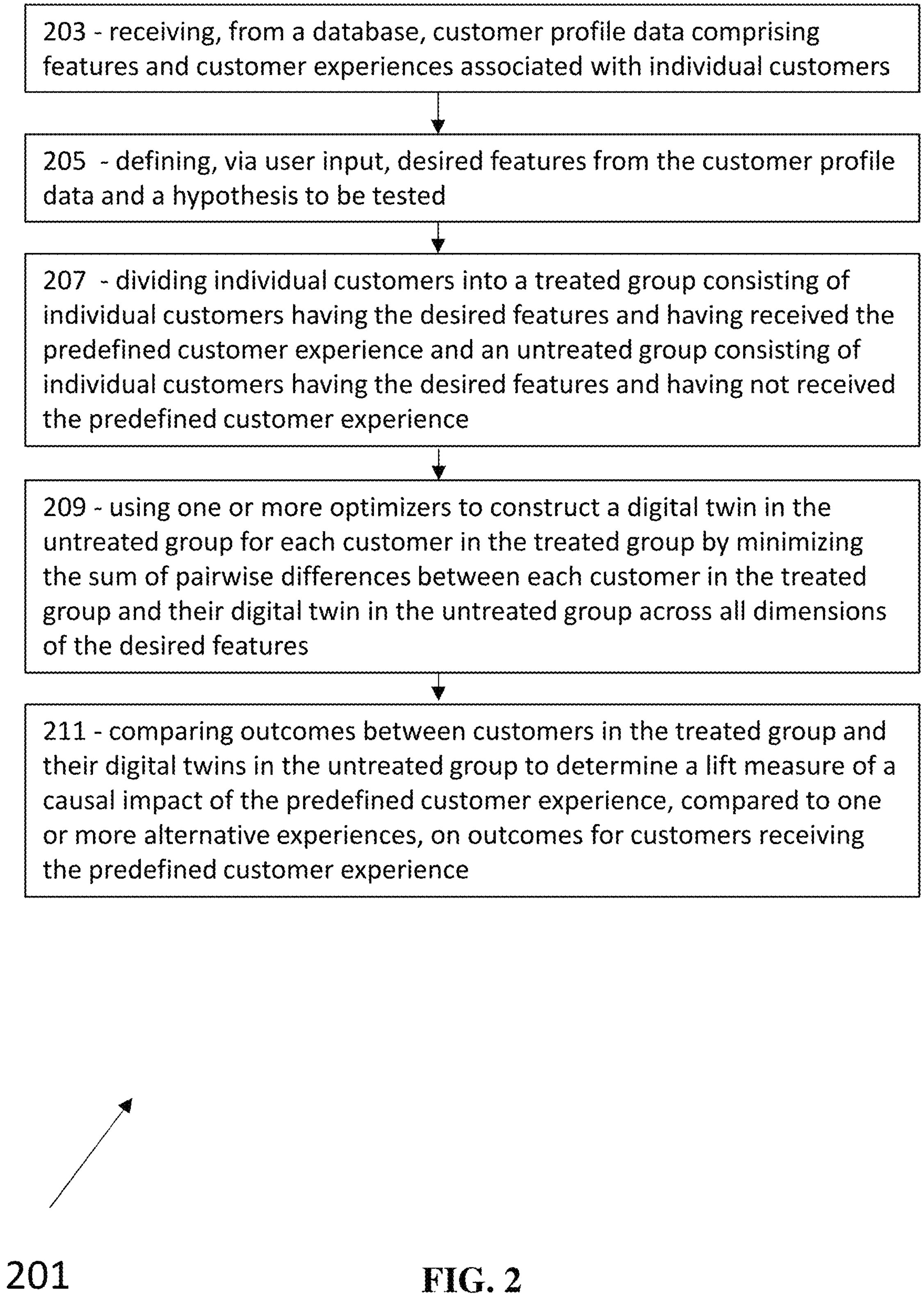
FIG. 2 shows an exemplary method for analyzing customer outcomes.

FIG. 2 shows an exemplary method 201 for analyzing customer outcomes. Customer profile data comprising features and customer experiences associated with individual customers are received 203, from a database. Desired features from the customer profile data and a hypothesis to be tested are defined 205, via user input. The hypothesis can comprise a customer outcome for a predefined customer experience. Individual customers can then be divided 207 into a treated group consisting of individual customers having the desired features and having received the predefined customer experience and an untreated group consisting of individual customers having the desired features and having not received the predefined customer experience. Using one or more optimizers, a digital twin can then be constructed 209 in the untreated group for each customer in the treated group by minimizing the sum of pairwise differences between each customer in the treated group and their digital twin in the untreated group across all dimensions of the desired features. Outcomes can then be compared 211 between customers in the treated group and their digital twins in the untreated group to determine a lift measure of a causal impact of the predefined customer experience, compared to one or more alternative experiences, on outcomes for customers receiving the predefined customer experience.

Figure 3:
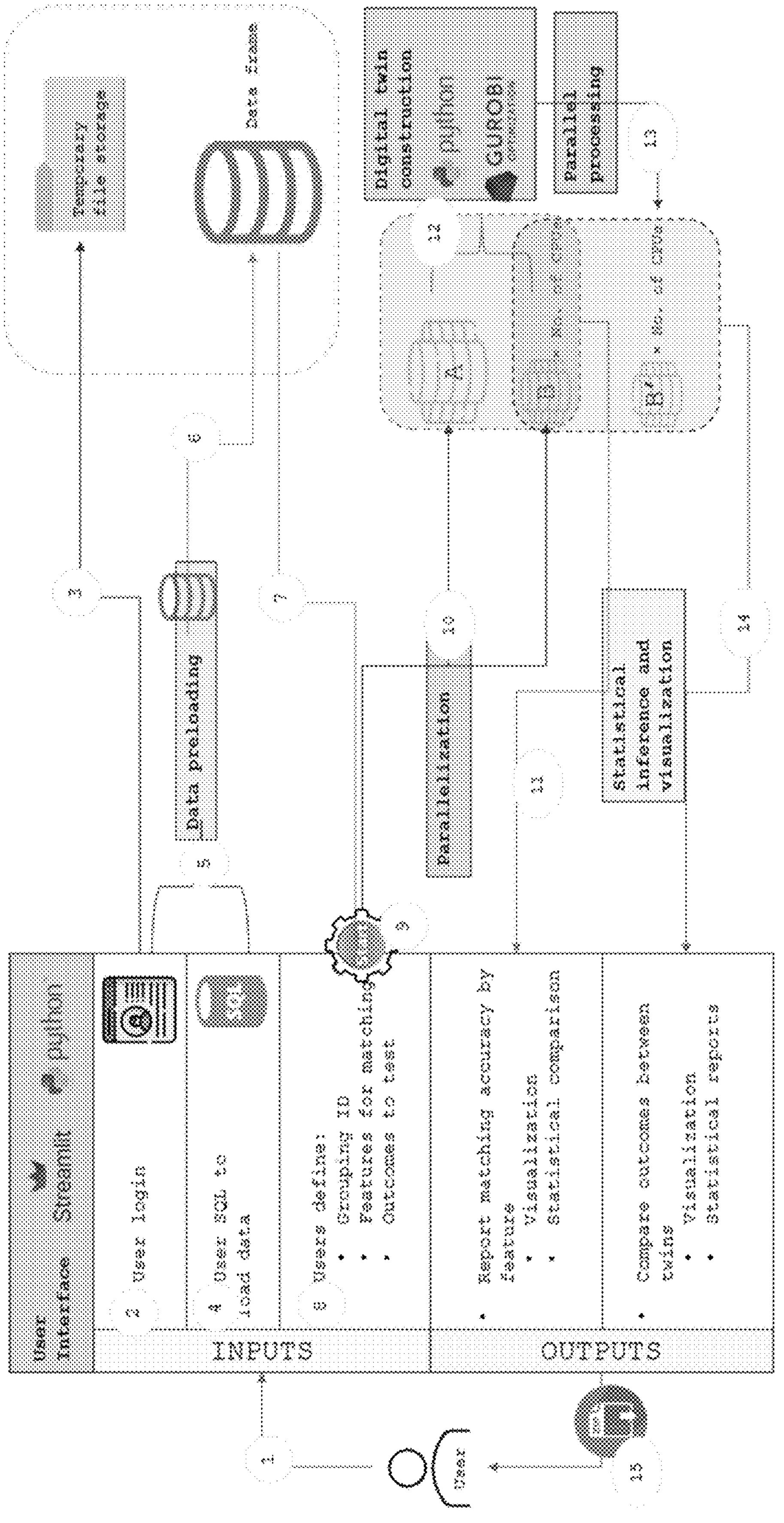
FIG. 3 shows an exemplary architecture of a computerized system for analyzing customer outcomes.

FIG. 3 shows an exemplary architecture of a computerized system for analyzing customer outcomes. In various embodiments, systems and methods can include the following components: First, data about individual customer's profiles, behaviors, and their financial outcomes can be accessed and processed into the computer/cluster memory. Any personally identifiable information can be removed or screened in order to protect customer privacy and comply with regulatory requirements.

Then, users can define what features about these profiles, behaviors, and financial outcomes will be used to characterize who an individual is for purposes of analyzing outcomes. The features can comprise known information obtained prior to the dates of an experience test window.

Subsequently, users can define what hypothesis they want to test. An exemplary hypothesis might be: to the customer segment defined by the range of features of age, gender, asset tiers, and call/digital engagement frequency in the past, and persona, an experience A, compared to experience(s) B, C, . . . , has a causal impact of 10% lift on these customers' outcomes, measured as engagement scores, call reduction, new accounts open, or net new money transferred. In various embodiments, the experiences may be mutually exclusive to enable the creation of isolated alternative scenarios. In some embodiments, systems and methods may prompt or restrict users to avoid selecting experiences that are not mutually exclusive. Users can match the feature names in the loaded data with the key variables in the hypothesis.

Next, the data of the customers can be divided into different experience scenarios, e.g., those in the experience A only, those in B only, and so on so forth. Suppose experience A is the baseline, then each customer in the A scenario will be called a treated customer, and those in other experience groups will be called untreated customers. An optimization solver can then be initiated to construct a digital twin in B or other scenarios to match each customer in scenario A. The optimization problem can be defined to minimize the sum of pairwise differences between a customer in A and their digital twins in in B or other scenarios in terms of all dimensions of features selected in step two above. An exemplary optimizer for use with systems and methods of the invention is Gurobi Optimizer available from Gurobi Optimization, LLC. Gurobi implementation of the optimization problem favors numerical stability and performance and is significantly faster than other open-source optimization platforms . . .

In various embodiments, one or more of the following optimization algorithms may be used to calculate the sum of pairwise difference: (i) The standard method; (ii) Ridge-augmented method; (iii) Lasso-augmented method; and (iv) penalized method. Detailed mathematical formulae for the calculations and example results are discussed in Example 2 below.

Pairs of customers in experience A and their digital twins in experience B and other scenarios can then be generated in parallelized computing, implemented using, for example, a Python multiprocessing package. The entire sample of customers in experience A can be divided into a number of parallel subsamples. Each subsample can be assigned to a processor. Customers in experience B and other scenarios may be used as a shared pool of raw data for constructing the digital twins. All the data can be copied to either shared memory or memory-mapped files so all processors can access them at the same time. By doing so, the overhead time for copying data between processes can be minimized.

Figure 4:
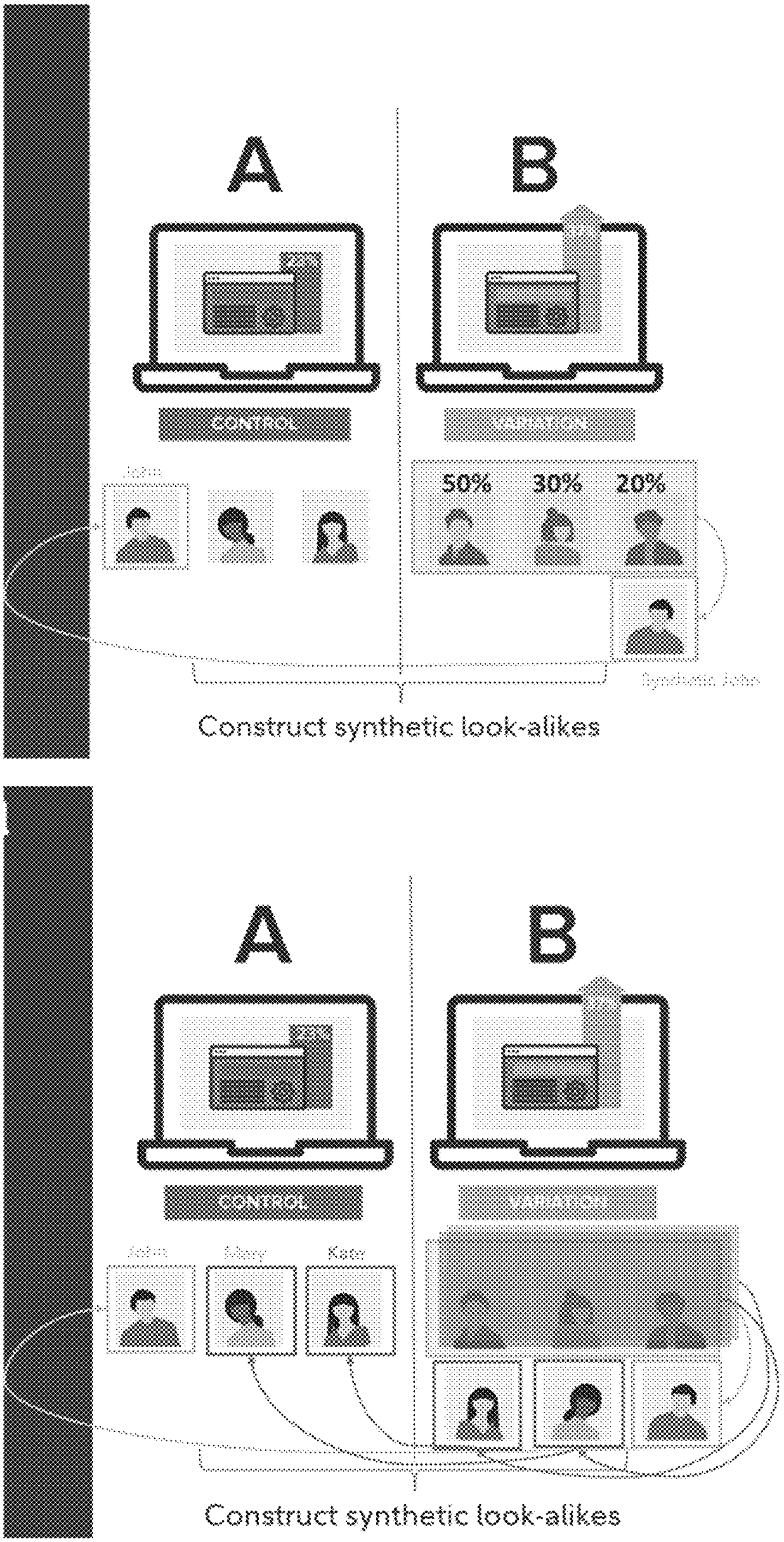
FIG. 4 illustrates weighted averaging of each customer in a group using parallel processing.

For each customer in each of the parallel subsamples, an optimization will be run to identify the weights for a maximum of 100 potentially similar customers from B and other scenarios. These 100 potentially similar customers are identified using PyTorch-based 100-nearest neighbor (100NN) method. After finding the weights for these 100 customers, a weighted average among these 100 customers will be generated into a single index new customer. That is, this customer's feature values will be a weighted average among the 100 raw customers. Any categorical features will be encoded into a list of binary values, that is, for each category, a binary variable is created to be 1 for yes and 0 for no for this category. Then the category value that received the highest weighted average will be the category value for the index new customer. The same weights will be used to calculate the outcomes post the experience dates for the index customer. Then all the pairs of customers and index customers will be re-combined from the parallel processors through a memory-mapped file into a single sample. FIG. 4 illustrates weighted averaging of each customer in a group using parallel processing.

Afterwards, predicted outcomes after the tested experience dates can be compared between the customers in A and their digital twins, that is, the matching index customers. The relative difference in the outcome can be given as a lift measure of the causal impact of A, compared to B and other experiences, on the outcomes for customers in A. Since the digital twins are created for each individual customer in A, the output can also be used to see the variation in the causal impact across different customers and aggregated by different ways of customer segmentation (e.g., by gender, age, assets under management, or nationality).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

EXAMPLES

Figure 5:
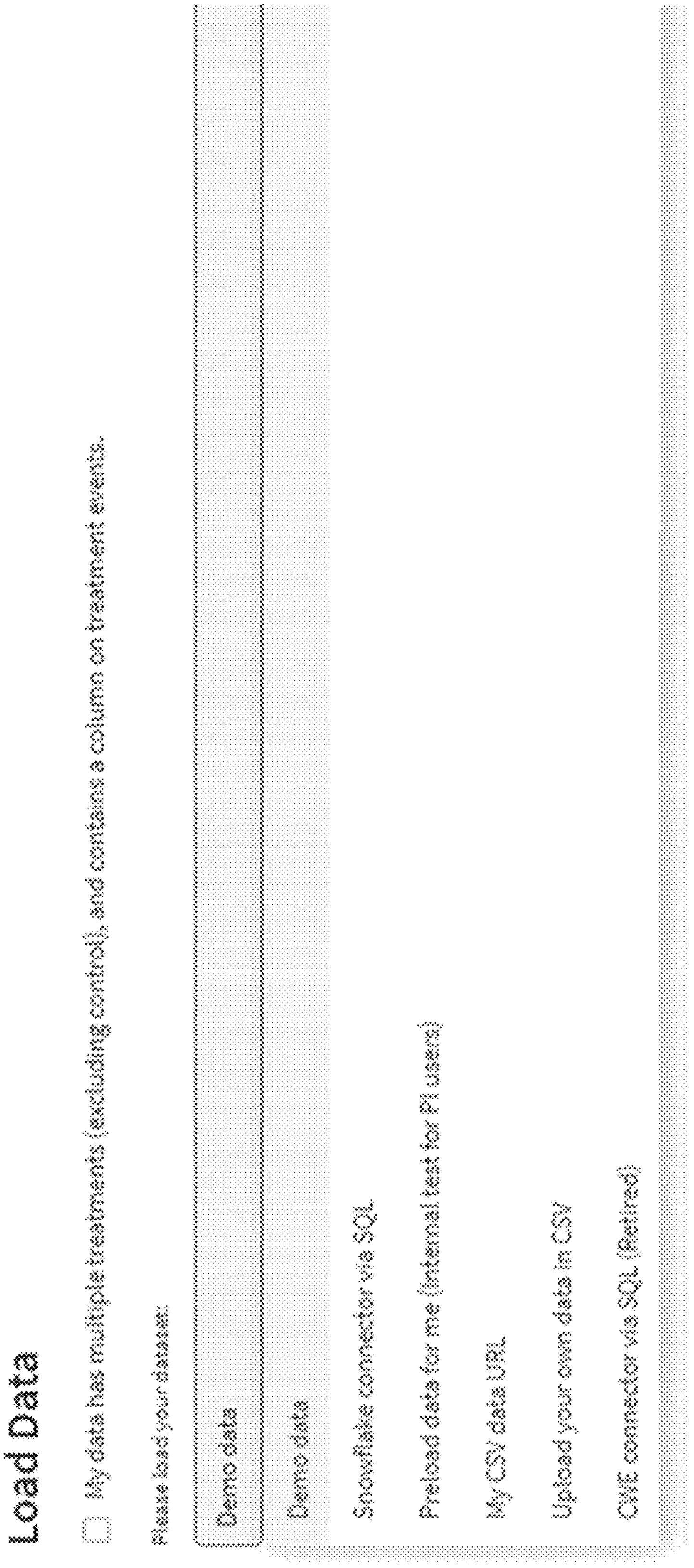
FIG. 5 illustrates an exemplary user interface for loading data.
Figure 6:
FIG. 6 illustrates an exemplary user interface for defining outcome metrics.
Figure 7:
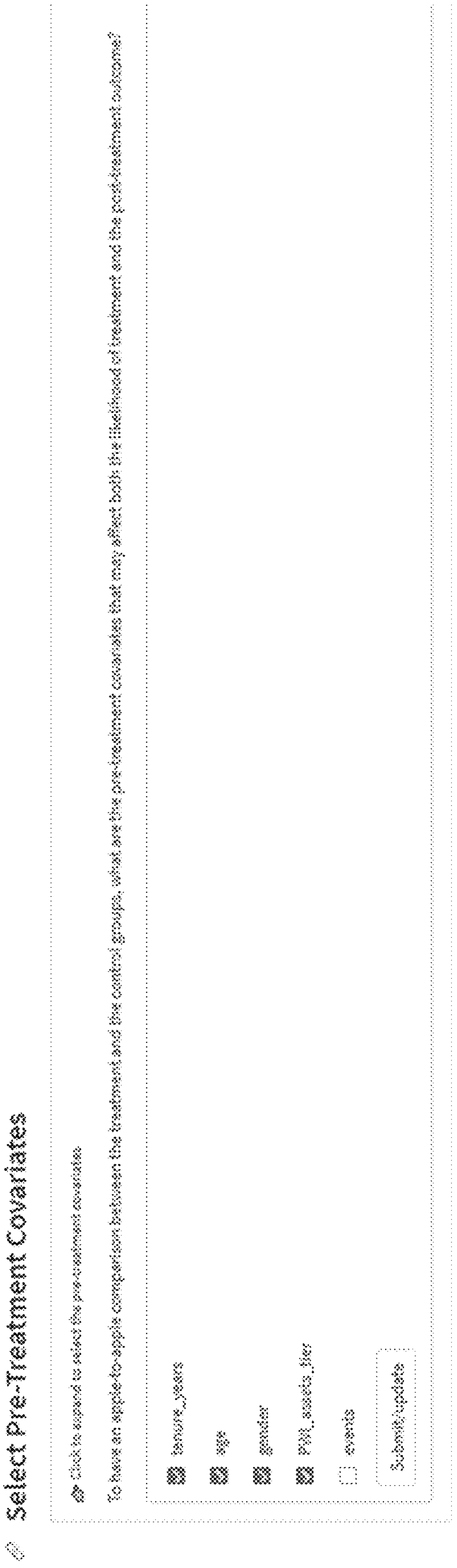
FIG. 7 illustrates an exemplary user interface for defining customer features.

Example 1: User Interaction with an Exemplary Customer Outcome Analysis System A user is able to load data through a user interface as depicted in FIG. 5. The user selects one or more sources for the customer data to be used in creating digital twins for customer outcome analysis. The user is then able to formulate a hypothesis based on the data. An exemplary user interface for doing so is shown in FIGS. 6 and 7. The user can select a treatment (e.g., a marketing campaign or other customer experience to be tested) and define outcome metrics to be estimated using the digital twins (see FIG. 6). For example, the user can select a number of outcomes to estimate (e.g., 2) and define those outcomes as money transfers at various time intervals before and after the treatment and trade volumes at various time intervals before and after the treatment. The user can also define desired features for the digital twins (see FIG. 7). These can be pre-treatment covariates that the system can use in creating the digital twins. For example, the user can select age, gender, assets, and tenure with the company as the covariates to be highlighted.

Figure 8:
FIG. 8 illustrates an exemplary user interface tracking parallel processing and providing results.

The system can then construct digital twins for the group in parallel processing. FIG. 8 shows an exemplary user interface providing tracking information during the digital twin construction process. The system has identified the number of CPUs available in the machine and informed the user that it is maintaining one for other work and using the remaining CPUs for parallel processing of digital twins. The system can also display a sample of the processed data for the digital twins as shown in FIG. 8.

The system can also calculate and report matching accuracy among the digital twins to allow the user to evaluate the quality or usefulness of the outcome estimates. FIG. 9 shows an exemplary display comparing treatment and synthetic control groups in pre-treatment covariates and outcome metrics.

Figure 10:
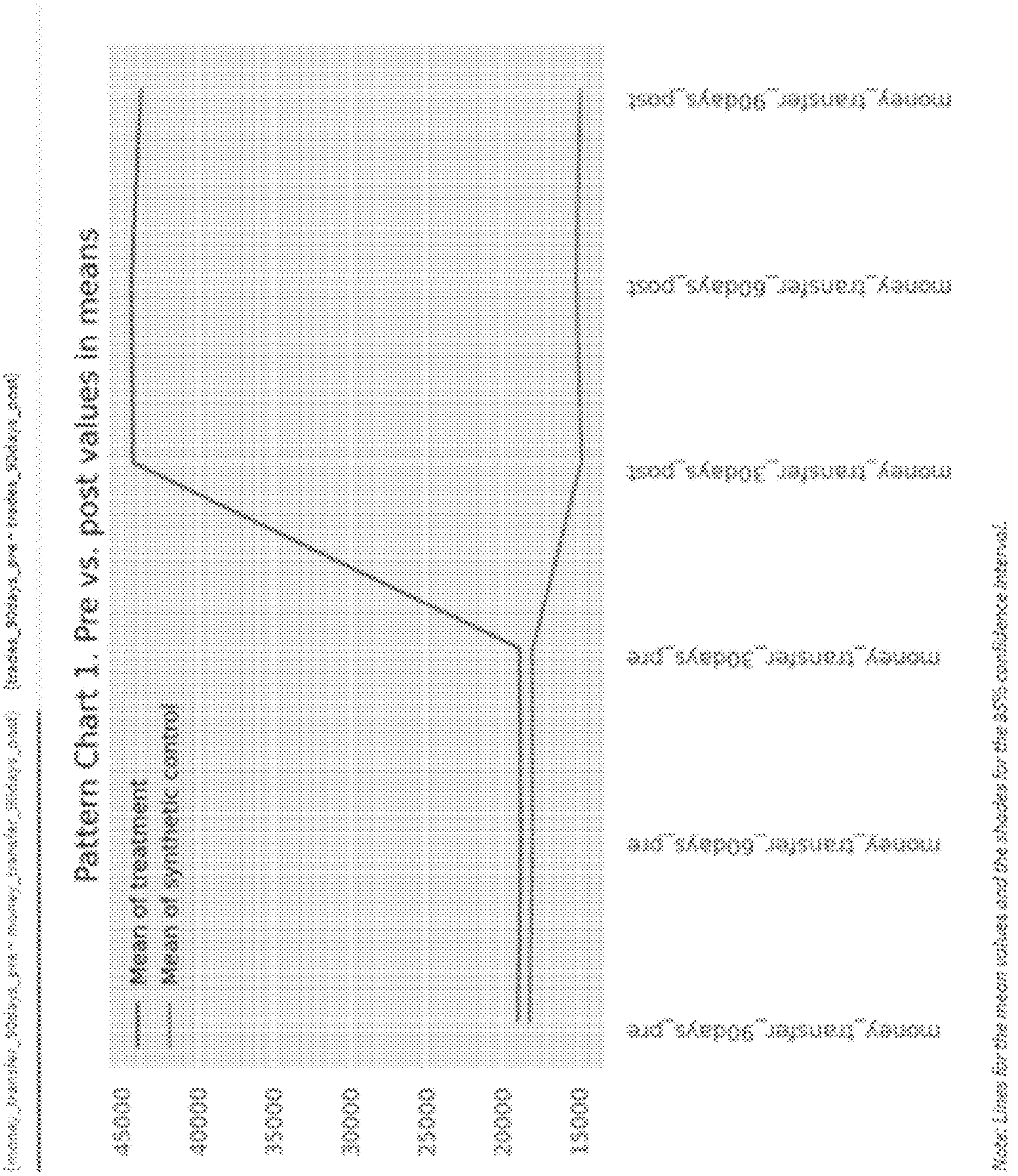
FIG. 10 illustrates an exemplary user interface comparing money transfer outcomes among digital twin groups before and after tested customer experience.
Figure 10:
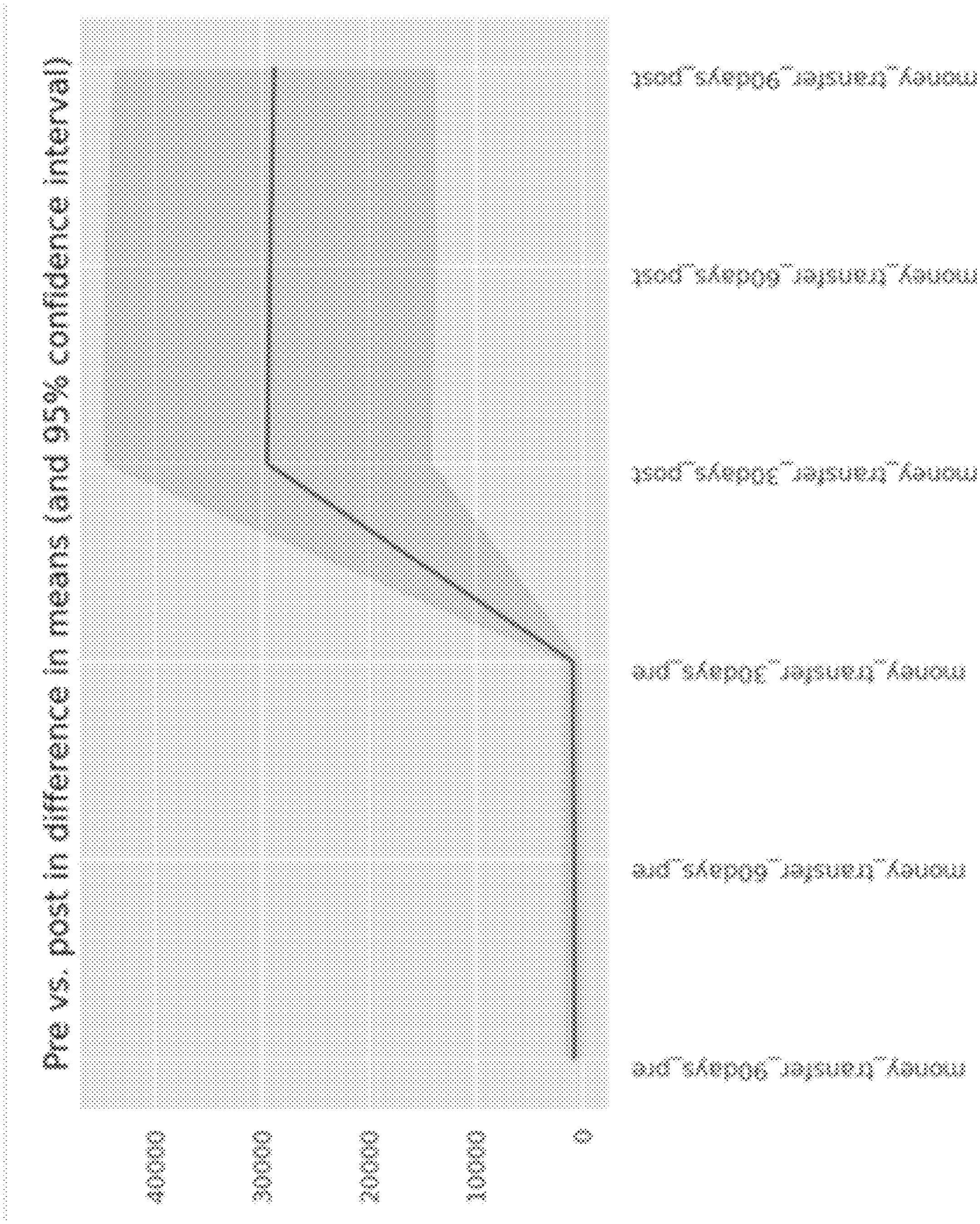
Figure 11:
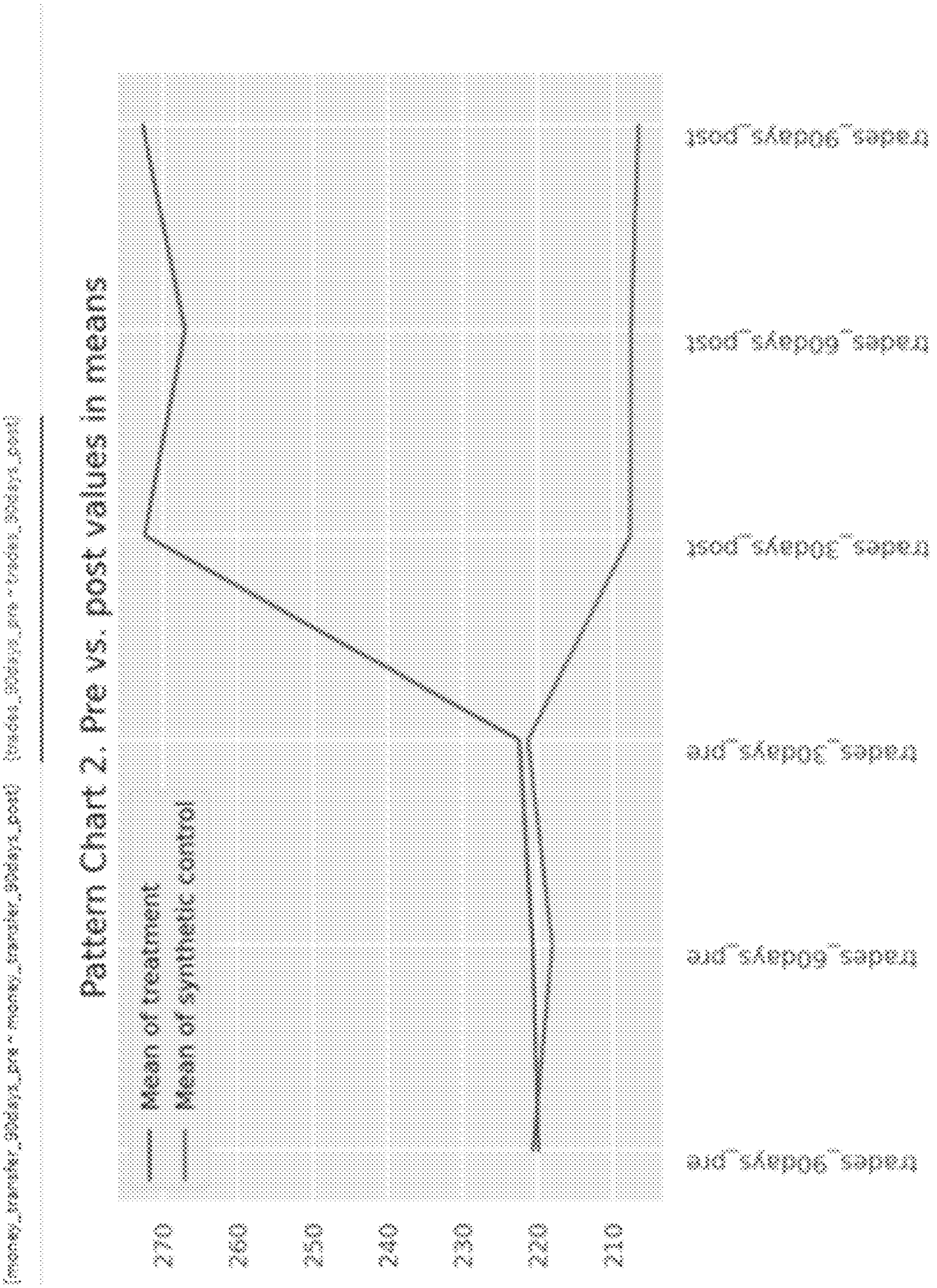
FIG. 11 illustrates an exemplary user interface for comparing trade volume outcomes among digital twin groups before and after tested customer experience.
Figure 11:
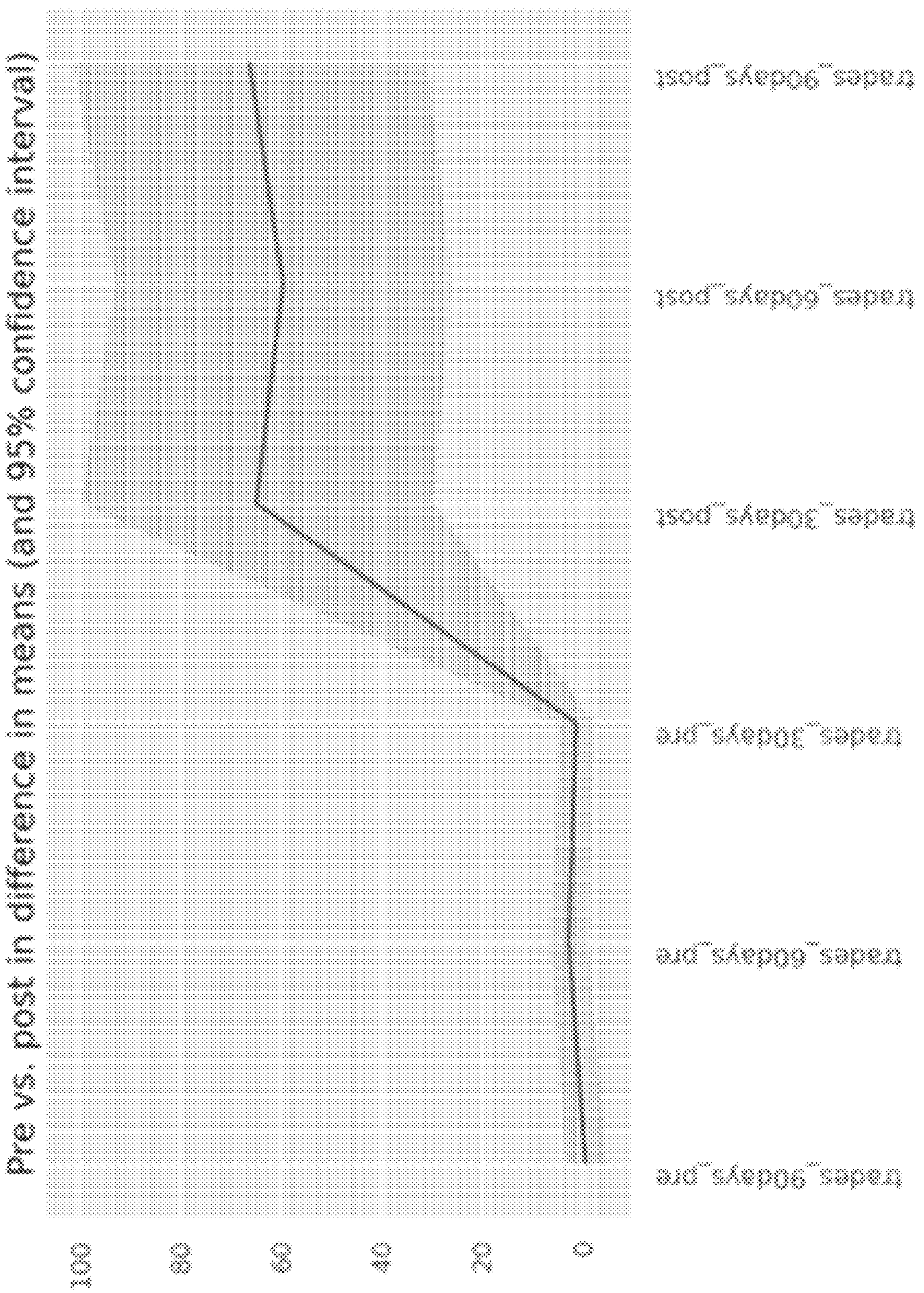

FIGS. 10-11 show exemplary visual reports comparing estimated outcomes among the treatment and synthetic control groups of digital twins. FIG. 10 shows pre and post treatment mean money transfers among both groups displayed as total values and a pre vs. post treatment difference in values. The system can further display a confidence interval (e.g., 95% as shown in the shaded area of the graphs in FIG. 10). FIG. 11 shows pre and post treatment mean trade volumes among both groups displayed as total values and a pre vs. post treatment difference in values.

The system can also display customer-level data for the synthetic or digital twins as part of the output. An exemplary table of customer level data is shown below:

| Customer ID | Number of trades if exposed by the new experience | Number of trades if not exposed with the new experience | Difference | Gender | Age | Asset_tier | Tenure in years | Number of trades before the new experience time window |
|---|---|---|---|---|---|---|---|---|
| 00001 | 26 | 14 | 8 | F | 56 | $10K-100K | 1.5 | 5 |
| 00002 | 0 | 12 | −12 | F | 45 | <$10K | 2 | 7 |
| 00003 | 11 | 8 | 3 | M | 29 | >$1M | 8.3 | 10 |

Example 2: Technical Details on Algorithms

Comparing Causal Inference Methods:

In addition to multiple rounds of rigorous peer reviews and coding validations, several popular causal inference methods were compared against each other in terms of matching performance (measured as similarity in means and STDs, and mean R2 score) and efficiency (time taken to complete the analysis).

All causal inference methods were performed on the same task. The task is to create look-alike matches based on each treated customer's pre-treatment features (NEW_MONEY_PRE, DIGITAL_VISIT_PRE, TRADES_PRE, AGE, TOTBAL_AMT_JUN, TRADES_COMM_R12, and SERVICE_PREMIUM), and then calculate the lift % in post-treatment outcomes (NEW_MONEY_POST, DIGITAL_VISIT_POST, and TRADES_POST).

$$\text{Lift (\%)}: 100*(\text{post-treatment outcome for the treated customer} - \text{post-treatment outcome for his/her matched control}) / \text{post-treatment outcome for his/her matched control}$$

Specifically, the performance metrics included:

mean diff: the difference in mean values between the treated and their matched (synthetic) controls;

$$\text{mean } diff\ (\%): 100*\text{mean } diff/\text{mean treated}$$

(the smaller the absolute value, the more similar the two groups);

p-value (mean diff=0): the t-test p-value to accept the null hypothesis that the two groups have the same means (the greater the value, the more similar the two groups), unpaired t-test for raw data, and paired t-test for matched data;

std diff: the difference in the standard deviations (std) between the treated and their matched (synthetic) controls (the smaller the value, the more similar the two groups);

p-value (std diff=0): the Levene test p-value to accept the null hypothesis that the two groups have the same stds (the greater the value, the more similar the two groups);

mean R2-score as calculated using the formula in FIG. 12; and time cost: how much time it took to complete the matching on a single node computer.

Data: All methods were used on the same random set of data with 100,000 customers, including roughly 5,000 treated customers. The data were randomly drawn from a customer data database. The same comparison analysis was replicated multiple rounds on a different random set of data, and the findings were very consistent.

The following methods were used:

1. Raw data without matching, that is, just comparing the mean difference between treated and untreated customers in the raw observational data.
2. 1-nearest neighbor (1NN) using PyTorch
3. Propensity-score matching (PSM)
   - PSM using Logistic regression to get the p-scores
   - PSM using XGBoost classifier (PSMX) to get the p-scores
   - PSM using Random Forest classifier (PSMRF) to get the p-scores
4. DAME-FLAME
   - DAME
   - FLAME
5. Synthetic control methods (SCM)
   - The standard SCM, which uses bounded optimization without extrapolations
   - Ridge-augmented SCM (RASCM), which uses unbounded optimization allowing extrapolations but penalizes overfitting using a Ridge regularization
   - Lasso-augmented SCM (LASCM), which uses unbounded optimization allowing extrapolations but penalizes overfitting using a Lasso regularization
   - Penalized SCM (PSCM), which uses bounded optimization without extrapolations and penalizes overfitting using a Ridge regularization on the distances The findings are summarized in FIG. 13 showing a lift calculation based on different match and compare approaches. The findings show that for creating look-alikes for treated customers, SCM and LASCM had the best matching performance, with a 0.962 and 0.973 mean R2 scores respectively. These two methods report very consistent lifts in the three outcome measures: NEW_MONEY, DIGITAL_VISIT, and TRADES. The other methods had relatively or considerably worse matching performance and, as a consequence, the lifts were significantly different, decreasing confidence in the estimated results.

Overall, the standard SCM shows a close-to-best matching performance among all methods, and it took significantly less time compared to LASCM. A parallelized computing solution can accelerate the SCM by the number of CPU.

Further details on the data, methods, and results are shown in FIGS. 14-28. FIG. 14 shows raw data without a synthetic control group. FIG. 15 shows results comparing treated groups and synthetic control groups after INN matching using PyTorch. FIG. 16 shows results comparing treated groups and synthetic control groups after propensity score matching (PSM) with p-scores calculated using a logistic regressor.

FIG. 17 shows results comparing treated groups and synthetic control groups after PSM matching with p-scores calculated using an XGBoost classifier (PSMX). FIG. 18 shows results comparing treated groups and synthetic control groups after PSM matching with p-scores calculated using a random forest classifier (PSMRF).

For the Dynamic Almost Matching Exactly (DAME) analysis, all continuous variables were discretized based on percentiles into 10 categories (if the variable has more than 50 unique values) or 4 categories (if no more than 50 unique values). After matching, each treated customer was paired in the original continuous variables with the average untreated customer in the same matched group. FIG. 19 shows results comparing treated groups and synthetic control groups after DAME matching.

For the Fast Large-Scale Almost Matching Exactly (FLAME) analysis, all continuous variables were discretized based on percentiles into 10 categories (if the variable has more than 50 unique values) or 4 categories (if no more than 50 unique values). After matching, each treated customer was paired in the original continuous variables with the average untreated customer in the same matched group. FIG. 20 shows results comparing treated groups and synthetic control groups after FLAME matching.

The best performing matching system overall was standard synthetic control matching (SCM) based on a 100-NN space. See Abadie, et al., 2015, Comparative politics and the synthetic control method, American Journal of Political Science, 59(2), 495-510, incorporated herein by reference. SCM calculations were performed as follows:

1. For each treated unit i=1, . . . , $n_1$, compute the j-vector of weights $$W_i^* = (W_{i,j=1}^*, \ldots, W_{i,j=100}^*)$$

that involves $$\min_{W_i \in \mathbb{R}^{100}} \left\| X_i - \sum_{j=1}^{100} W_{i,j} X_j \right\|^2$$

$$\text{s.t. } W_{i,1} \geq 0, \ldots, W_{i,100} \geq 0, \sum_{j=1}^{100} W_{i,j} = 1$$

Where $X_i$ is a vector of features $$\begin{bmatrix} x_{i,k=1} \\ \vdots \\ x_{i,k=K} \end{bmatrix}$$

for the ith treated unit to be matched on and there are K features in total, $X_{i,j}$ is the vector of the same features for jth untreated unit for constructing the synthetic control for treated unit i, $$W_{i,j}^*$$

is the weight given to jth untreated unit in the synthetic control unit corresponding to the ith treated unit.

A synthetic control estimate of the effect of the treatment on treated unit i is:

$$\hat{\tau}_i = Y_i - \sum_{j=1}^{100} W_{i,j}^* Y_j$$

Where $Y_i$ is the outcome vector $$\begin{bmatrix} y_{i,m=1} \\ \vdots \\ y_{i,m=M} \end{bmatrix}$$

for the ith treated unit and there are M outcome metrics in total, and the $Y_{i,j}$ is the same outcome vector for the jth untreated unit used for constructing the synthetic control for treated unit i.

2. Averaging the treatment effects on the treated produces a synthetic control estimate of τ, $$\hat{\tau}_i = \frac{1}{n_1} \sum_{i=1}^{n_1} \left[ Y_i - \sum_{j=1}^{100} W_{i,j}^* Y_j \right]$$

FIG. 21 shows results comparing treated groups and synthetic control groups after SCM matching.

Ridge-Augmented SCM (RASCM) based on a 100-NN space was performed as follows. See Ben-Michael, et al., 2021, The augmented synthetic control method, Journal of the American Statistical Association, 116(536), 1789-1803, incorporated herein by reference.

1. For each treated unit i=1, . . . , $n_1$, compute the j-vector of weights $$W_i^* = (W_{i,j=1}^*, \ldots, W_{i,j=100}^*)$$

that solves $$\min_{W_i \in \mathbb{R}^{100}} \frac{1}{2} \left\| X_i - \sum_{j=1}^{100} W_{i,j} X_j \right\|^2 + \alpha^{ridge} \sum_{j=1}^{100} \| W_{i,j} \|^2$$

Where $X_i$ is a vector of features $$\begin{bmatrix} 1 \\ x_{i,k=1} \\ \vdots \\ x_{i,k=K} \end{bmatrix}$$

for the ith treated unit to be matched on and there are K features in total, $X_{i,j}$ is the vector of the same features for jth untreated unit for constructing the synthetic control for treated unit i, $$W_{i,j}^*$$

is the weight given to jth untreated unit in the synthetic control unit corresponding to the ith treated unit.

$\alpha^{ridge} \geq 0$ is the ridge regularization factor, the greater this factor is, the greater the regularization is weighted on.

A synthetic control estimate of the effect of the treatment on treated unit i is:

$$\hat{\tau}_i = Y_i - \sum_{j=1}^{100} W_{i,j}^* Y_j$$

Where $Y_i$ is the outcome vector $$\begin{bmatrix} y_{i,m=1} \\ \vdots \\ y_{i,m=M} \end{bmatrix}$$

for the ith treated unit and there are M outcome metrics in total, and the $Y_{i,j}$ is the same outcome vector for the jth untreated unit used for constructing the synthetic control for treated unit i.

2. Averaging the treatment effects on the treated produces a synthetic control estimate of τ, $$\hat{\tau}_i = \frac{1}{n_1}\sum_{i=1}^{n_1}\left[Y_i - \sum_{j=1}^{100} W_{i,j}^* Y_j\right]$$

Note: Unlike the traditional Synthetic control method

[1] the following constraints were removed:

$$\text{s.t. } W_{i,j} \geq 0, \ldots, W_{i,100} \geq 0, \sum_{j=1}^{100} W_{i,j} = 1$$

[2] A constant term 1 is added to each vector of features X.

FIG. 22 shows results comparing treated groups and synthetic control groups after RASCM matching.

Lasso-Augmented SCM (LASCM) based on a 100-NN space was performed as follows. See Amjad, et al., 2018, Robust synthetic control, The Journal of Machine Learning Research, 19(1), 802-852, incorporated herein by reference.

1. For each treated unit i=1, . . . , $n_1$, compute the j-vector of weights $$W_i^* = \left(W_{i,j=1}^*, \ldots, W_{i,j=100}^*\right)$$

that solves:

$$\min_{W_i \in \mathbb{R}^{100}} \frac{1}{2}\left\| X_i - \sum_{j=1}^{100} W_{i,j} X_j \right\|^2 + \alpha^{lasso} \sum_{j=1}^{100} |W_{i,j}|$$

Where $X_i$ is a vector of features $$\begin{bmatrix} 1 \\ x_{i,k=1} \\ \vdots \\ x_{i,k=K} \end{bmatrix}$$

for the ith treated unit to be matched on and there are K features in total, $X_{i,j}$ is the vector of the same features for jth untreated unit for constructing the synthetic control for treated unit i, $$W_{i,j}^*$$

is the weight given to jth untreated unit in the synthetic control unit corresponding to the ith treated unit.

$\alpha^{lasso} \geq 0$ is the lasso regularization factor, the greater this factor is, the greater the regularization is weighted on.

A synthetic control estimate of the effect of the treatment on treated unit i is:

$$\hat{\tau}_i = Y_i - \sum_{j=1}^{100} W_{i,j}^* Y_j$$

Where $Y_i$ is the outcome vector $$\begin{bmatrix} y_{i,m=1} \\ \vdots \\ y_{i,m=M} \end{bmatrix}$$

for the ith treated unit and there are M outcome metrics in total, and the $Y_{i,j}$ is the same outcome vector for the jth untreated unit used for constructing the synthetic control for treated unit i.

2. Averaging the treatment effects on the treated produces a synthetic control estimate of t, $$\hat{\tau}_i = \frac{1}{n_1}\sum_{i=1}^{n_1}\left[Y_i - \sum_{j=1}^{100} W_{i,j}^* Y_j\right]$$

Note: Unlike the traditional Synthetic control method

[1] the following constraints were removed:

$$\text{s.t. } W_{i,1} \geq 0, \ldots, W_{i,100} \geq 0, \sum_{j=1}^{100} W_{i,j} = 1$$

[2] A constant term 1 is added to each vector of features X.

FIG. 23 shows results comparing treated groups and synthetic control groups after LASCM matching.

Penalized SCM (PSCM) based on 100-NN space was performed as follows. See Abadie, A. & L'hour, J., 2021, A penalized synthetic control estimator for disaggregated data, Journal of the American Statistical Association, 116(536), 1817-1834, incorporated herein by reference.

1. For each treated unit i=1, . . . , n, compute the j-vector of weights $$W_i^* = \left(W_{i,j=1}^*, \ldots, W_{i,j=100}^*\right)$$

that solves:

$$\min_{W_i \in \mathbb{R}^{100}} \frac{1}{2}\left\| X_i - \sum_{j=1}^{100} W_{i,j} X_j \right\|^2 + \alpha^{ridge} \sum_{j=1}^{100} W_{i,j} \|X_i - X_j\|^2$$

$$\text{s.t. } W_{i,1} \geq 0, \ldots, W_{i,100} \geq 0, \sum_{j=1}^{100} W_{i,j} = 1$$

Where $X_i$ is a vector of features $$\begin{bmatrix} x_{i,k=1} \\ \vdots \\ x_{i,k=K} \end{bmatrix}$$

for the ith treated unit to be matched on and there are K features in total, $X_{i,j}$ is the vector of the same features for jth untreated unit for constructing the synthetic control for treated unit i, $$W^*_{i,j}$$

is the weight given to jth untreated unit in the synthetic control unit corresponding to the ith treated unit.

$\alpha^{ridge} \geq 0$ is the ridge regularization factor, the greater this factor is, the greater the regularization is weighted on.

A synthetic control estimate of the effect of the treatment on treated unit i is:

$$\hat{\tau}_i = Y_i - \sum_{j=1}^{100} W^*_{i,j} Y_j$$

Where $Y_i$ is the outcome vector $$\begin{bmatrix} y_{i,m=1} \\ \vdots \\ y_{i,m=M} \end{bmatrix}$$

for the ith treated unit and there are M outcome metrics in total, and the $Y_{i,j}$ is the same outcome vector for the jth untreated unit used for constructing the synthetic control for treated unit i.

2. Averaging the treatment effects on the treated produces a synthetic control estimate of t, $$\hat{\tau}_i = \frac{1}{n_1} \sum_{i=1}^{n_1} \left[ Y_i - \sum_{j=1}^{100} W^*_{i,j} Y_j \right]$$

FIG. 24 shows results comparing treated groups and synthetic control groups after PSCM matching.

Figure 26:
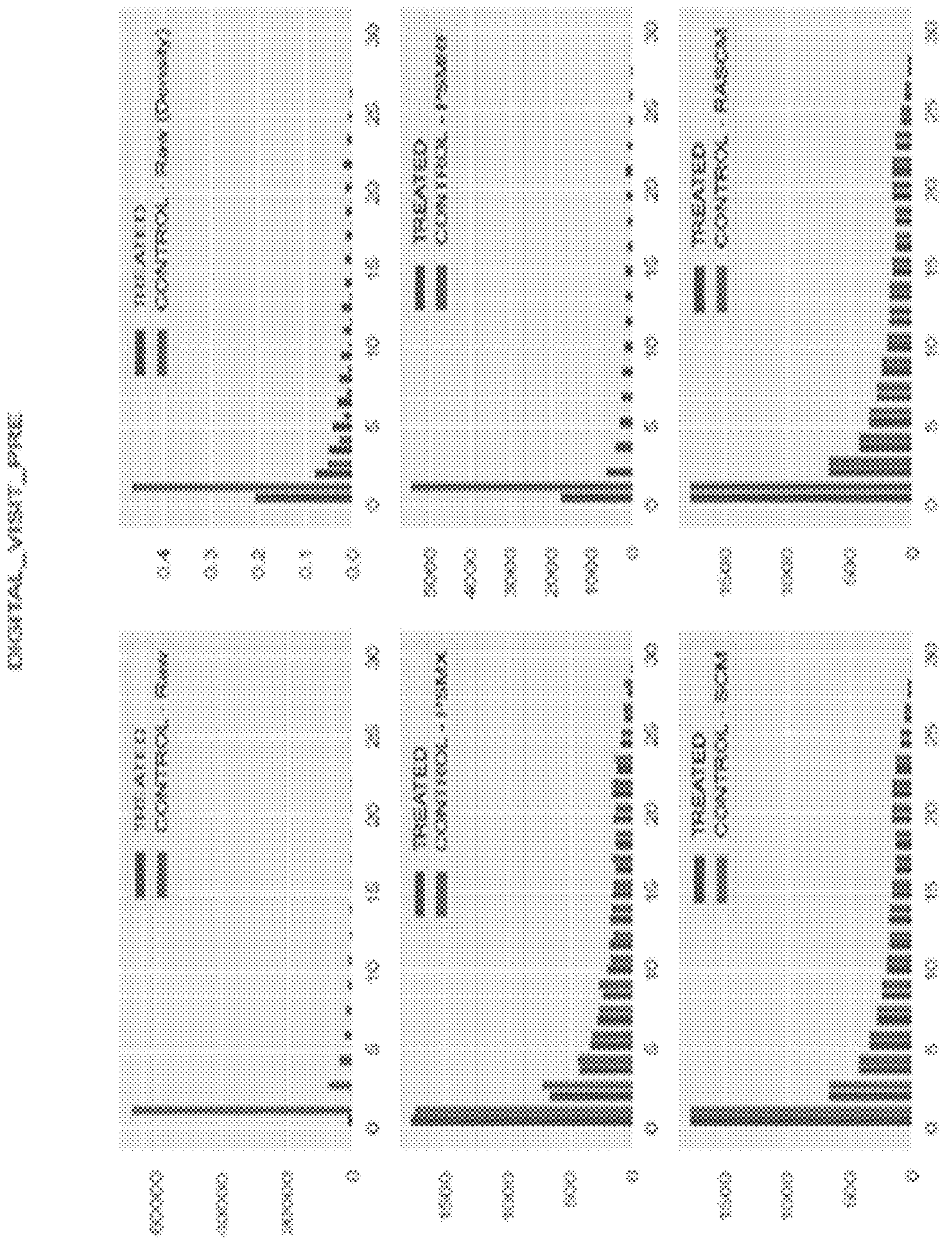
FIG. 26 compares the digital visit metric, pretreatment between treatment group and synthetic control groups created using the various matching methods.
Figure 26:
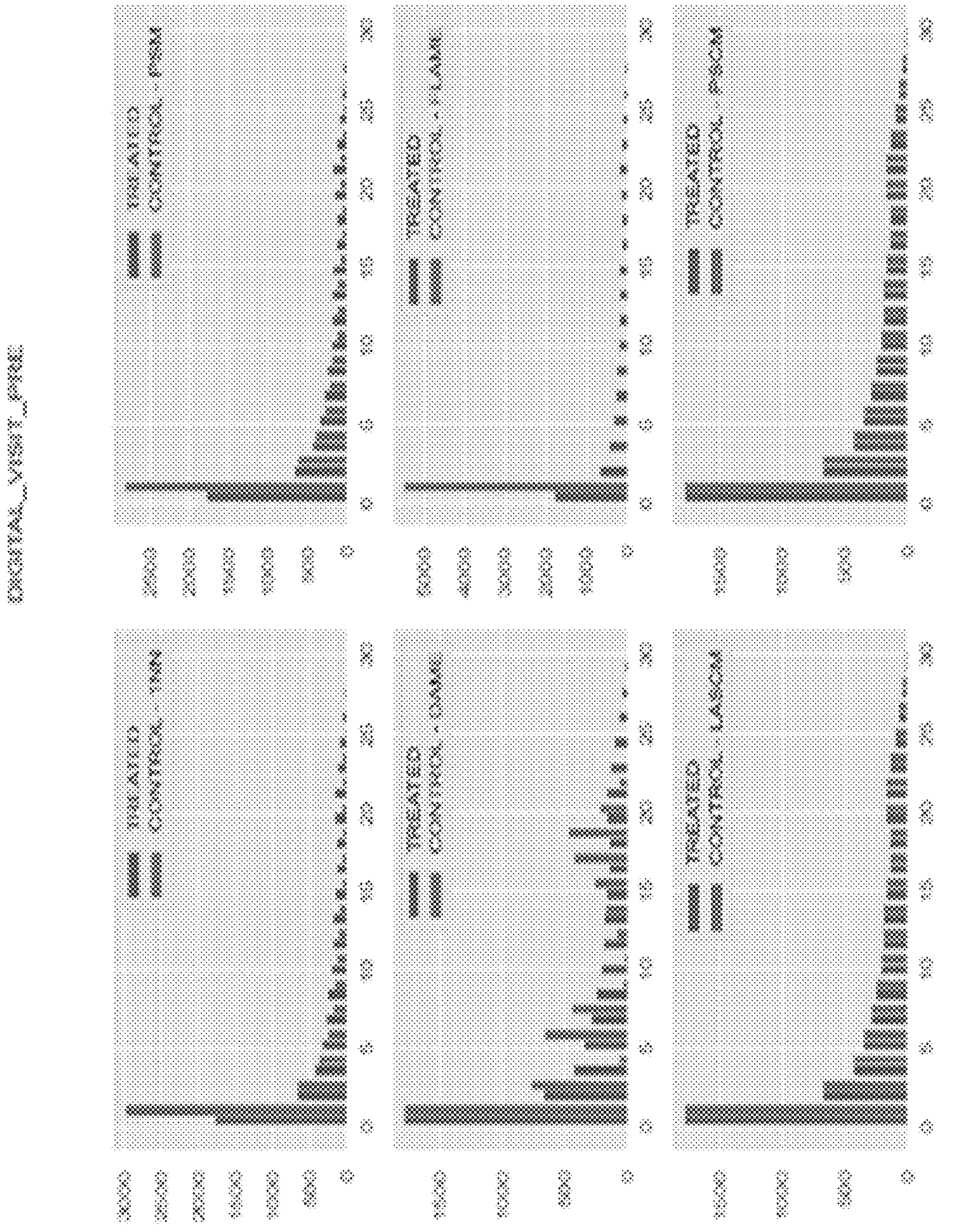
Figure 27:
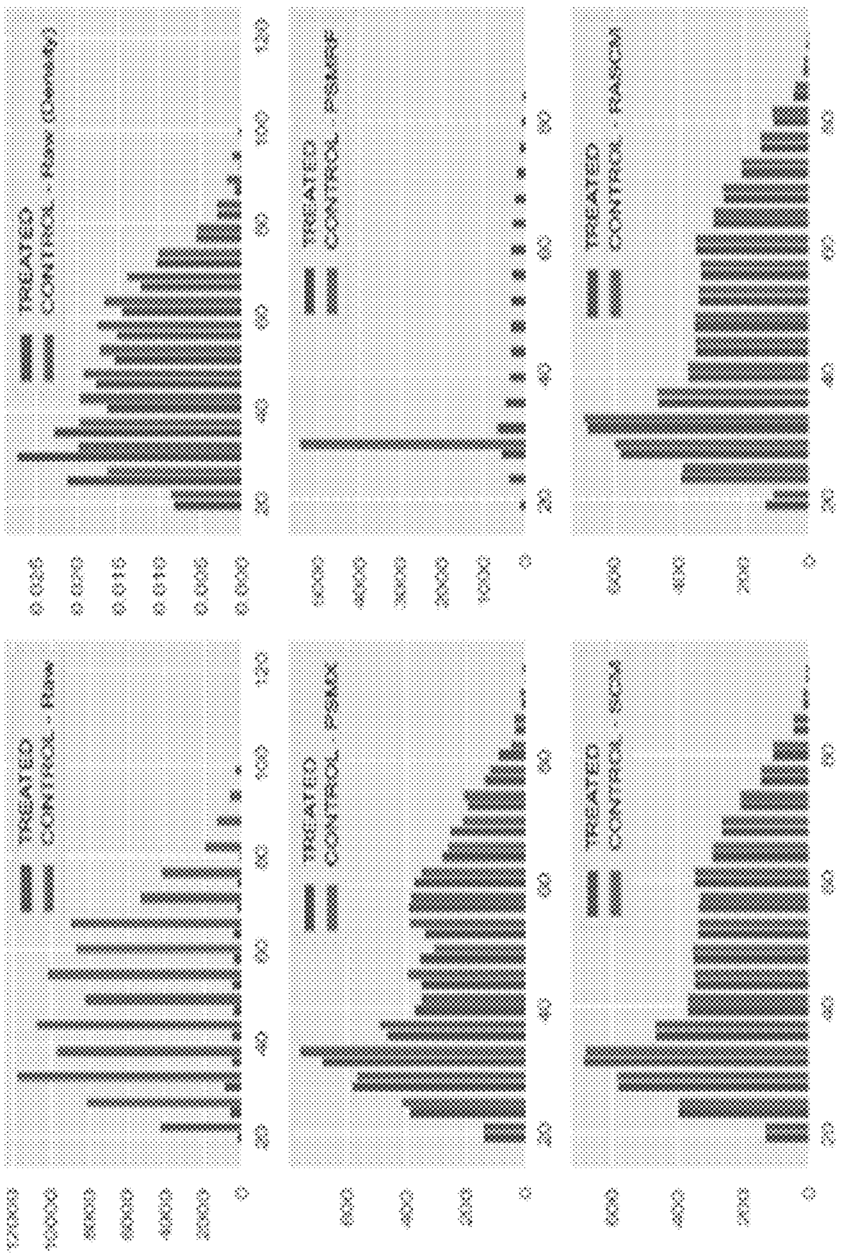
FIG. 27 compares age among the treatment group and synthetic control groups created using the various matching methods.
Figure 27:
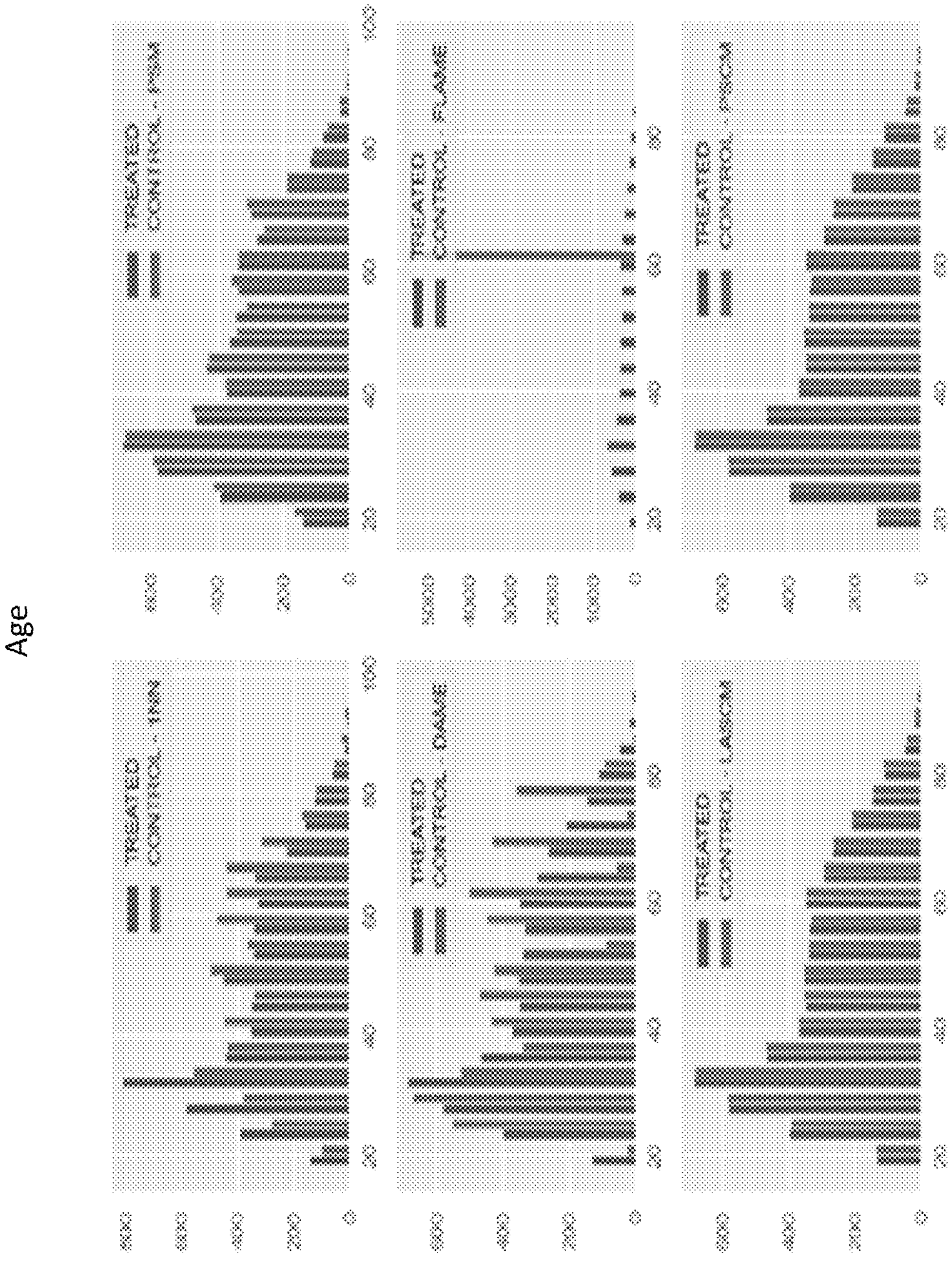
Figure 28:
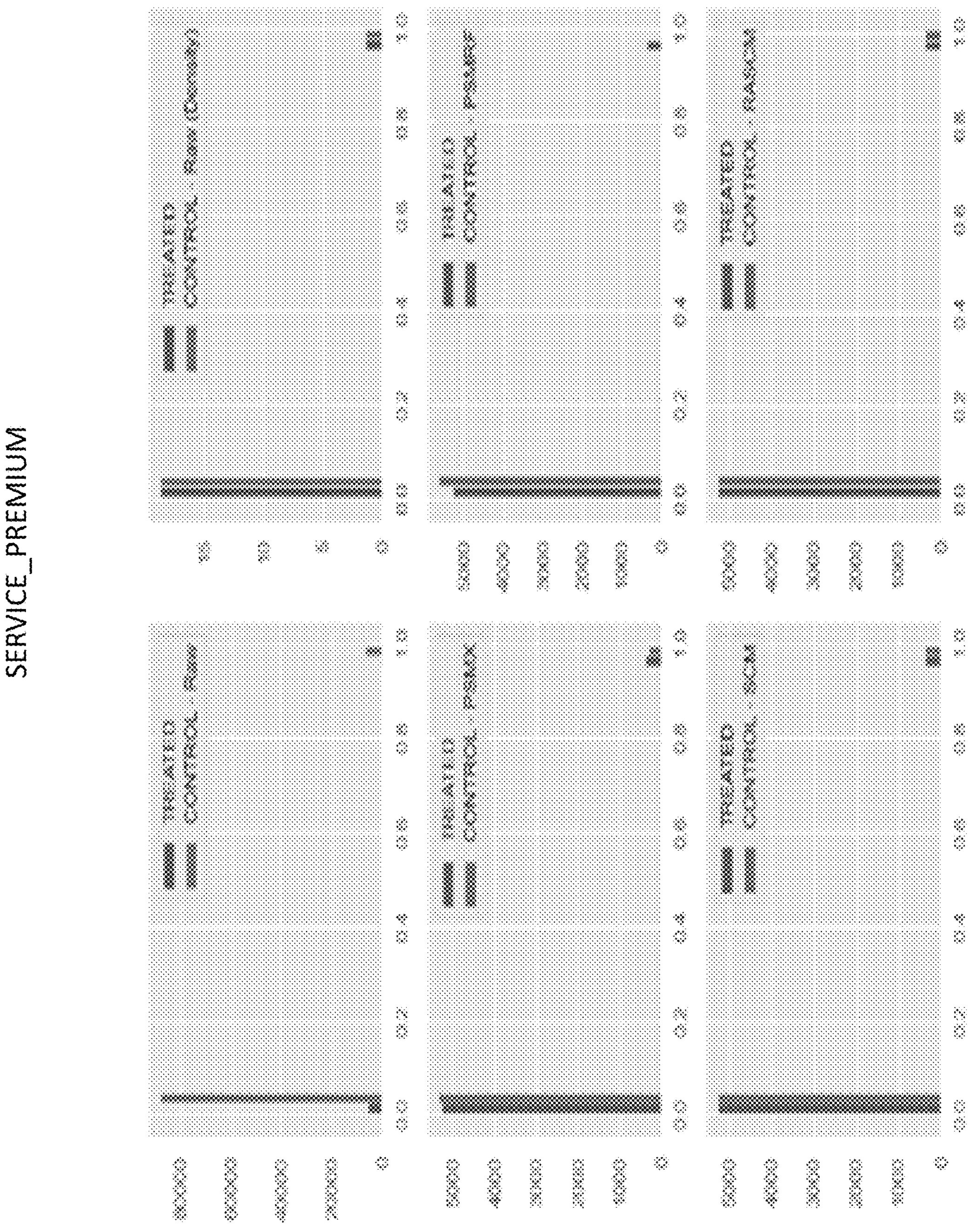
FIG. 28 compares a service premium metric between treatment group and synthetic control groups created using the various matching methods
Figure 28:
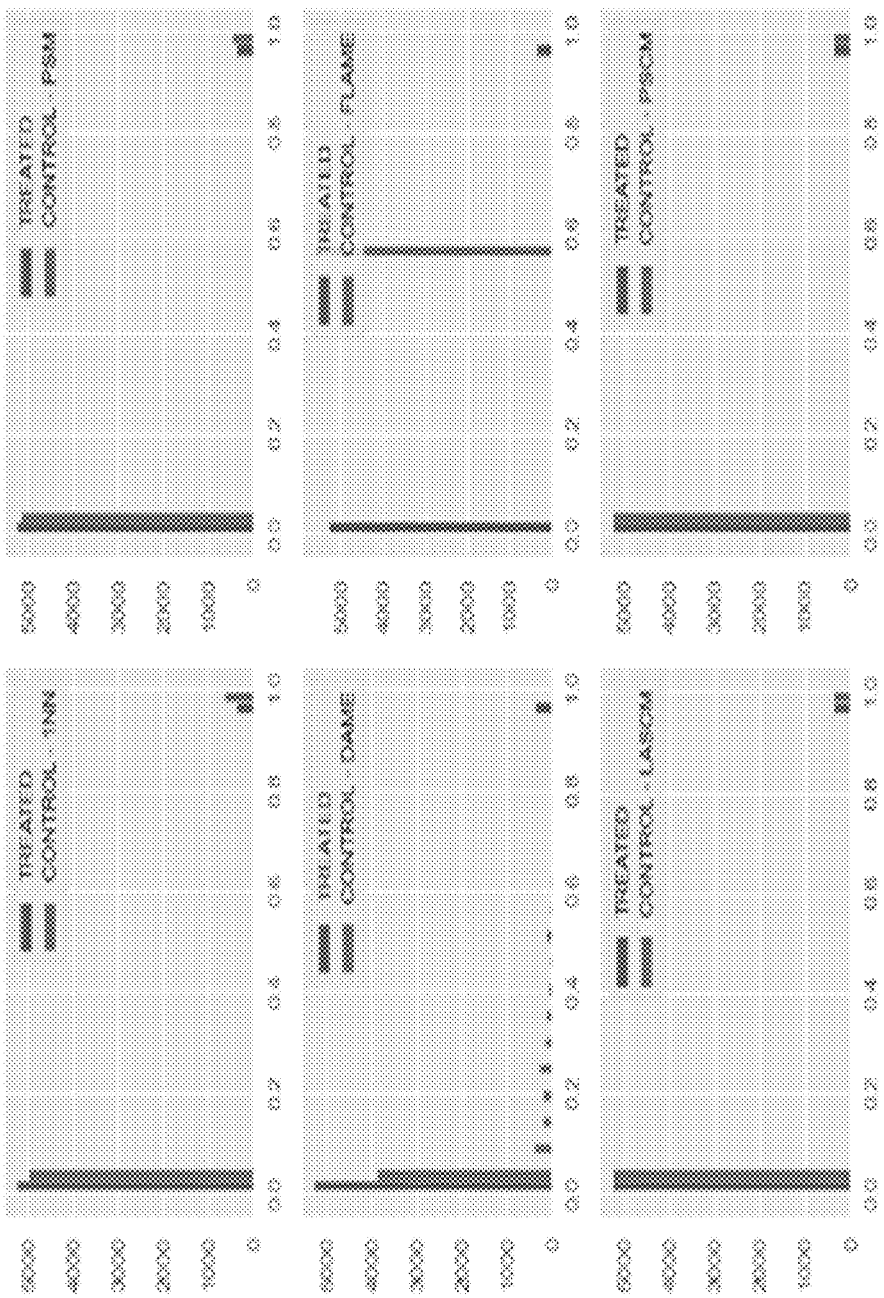

FIG. 25 shows results comparing a random customer and their control matched by various methods. FIGS. 26-28 show visual comparisons of the results including density histograms for visualization of the distributions of the treated groups and synthetic controls matched using the various methods described above. FIG. 26 compares the digital visit metric, pretreatment between treatment group and synthetic control groups created using the various matching methods. FIG. 27 compares age among the treatment group and synthetic control groups created using the various matching methods. FIG. 28 compares a service premium metric between treatment group and synthetic control groups created using the various matching methods.

What is claimed is:

1. A computerized method for analyzing customer outcomes, the method comprising:

receiving, from a database, customer profile data comprising features and customer experiences associated with individual customers;

defining, via user input, desired features from the customer profile data and a hypothesis to be tested, wherein the hypothesis comprises a customer outcome for a predefined customer experience;

dividing individual customers into a treated group consisting of individual customers having the desired features and having received the predefined customer experience and an untreated group consisting of individual customers having the desired features and having not received the predefined customer experience;

using one or more optimizers to construct a digital twin in the untreated group for each customer in the treated group by minimizing the sum of pairwise differences between each customer in the treated group and their digital twin in the untreated group across all dimensions of the desired features, wherein constructing the digital twin in the untreated group for each customer in the treated group further comprises:

dividing the customers in the treated group into a number of parallel subsamples;

using customers in the untreated group as a shared pool of raw data for constructing the digital twins;

assigning each parallel subsample to a different processor;

running, for each customer in each of the parallel subsamples, an optimization to identify weights for a maximum of 100 potentially similar customers from the untreated group, wherein customers in each parallel subsample are run on different processors in parallel; and generating a single index new customer for each customer in each of the parallel subsamples as a digital twin for that customer; and comparing outcomes between customers in the treated group and their digital twins in the untreated group to determine a lift measure of a causal impact of the predefined customer experience, compared to one or more alternative experiences, on outcomes for customers receiving the predefined customer experience.

2. The computerized method of claim 1, wherein the single index new customer is assigned values for each of the desired features that are a weighted average of each of the desired features among the 100 potentially similar customers from the untreated group.

3. The computerized method of claim 2, wherein the running and generating steps comprise encoding any categorical features into a list of binary values.

4. The computerized method of claim 3, wherein the generating step further comprises assigning to the single index new customer a value for each categorical feature consisting of the binary value that received the highest weighted average.

5. The computerized method of claim 2, wherein the comparing step further comprises using the weights identified in the running step in determining the lift measure.

6. The computerized method of claim 1, further comprising copying the shared pool of raw data into a shared memory or memory-mapped file to allow each of the different processors to access the shared pool of raw data simultaneously.

7. The computerized method of claim 1, further comprising recombining all pairs of customers in each of the parallel subsamples and their respective digital twins from the different processors through a memory-mapped file into a single sample for use in the comparing step.

8. The computerized method of claim 2, further comprising identifying the 100 potentially similar customers from the untreated group using a PyTorch-based 100-nearest neighbor (100NN) method.

9. The computerized method of claim 1, wherein the untreated group comprises individual customers receiving a plurality of different customer experiences, the method further comprising:

using the one or more optimizers to construct a digital twin for each of the plurality of different customer experiences in the untreated group for each customer in the treated group; and comparing outcomes between customers in the treated group and their digital twins in each of the plurality of different customer experiences to determine the lift measure of the causal impact of the predefined customer experience, compared to each of the different customer experiences, on the outcomes for customers receiving the predefined customer experience.

10. The computerized method of claim 1, wherein the features comprise data about individual customer's profiles, behaviors, or their financial outcomes prior to and after a customer experience.

11. The computerized method of claim 10, further comprising removing any personally identifiable information from the features.

12. The computerized method of claim 1, wherein the hypothesis to be tested comprises a predicted lift measure for customers having the desired features and receiving the predefined customer experience versus another customer experience.

13. The computerized method of claim 1, wherein the one or more optimizers comprise regularized weighted quadratic programming.

14. A computer system for analyzing customer outcomes, the system comprising a processor in communication with a non-transient memory and operable to perform the steps of:

receiving, from a database, customer profile data comprising features and customer experiences associated with individual customers;

defining, via user input, desired features from the customer profile data and a hypothesis to be tested, wherein the hypothesis comprises a customer outcome for a predefined customer experience;

dividing individual customers into a treated group consisting of individual customers having the desired features and having received the predefined customer experience and an untreated group consisting of individual customers having the desired features and having not received the predefined customer experience;

using one or more optimizers to construct a digital twin in the untreated group for each customer in the treated group by minimizing the sum of pairwise differences between each customer in the treated group and their digital twin in the untreated group across all dimensions of the desired features, wherein constructing the digital twin in the untreated group for each customer in the treated group further comprises:

dividing the customers in the treated group into a number of parallel subsamples;

using customers in the untreated group as a shared pool of raw data for constructing the digital twins;

assigning each parallel subsample to a different processor;

running, for each customer in each of the parallel subsamples, an optimization to identify weights for a maximum of 100 potentially similar customers from the untreated group, wherein customers in each parallel subsample are run on different processors in parallel; and generating a single index new customer for each customer in each of the parallel subsamples as a digital twin for that customer; and comparing outcomes between customers in the treated group and their digital twins in the untreated group to determine a lift measure of a causal impact of the predefined customer experience, compared to other experiences, on the outcomes for customers receiving the predefined customer experience.

15. The computer system of claim 14, wherein the single index new customer is assigned values for each of the desired features that are a weighted average of each of the desired features among the 100 potentially similar customers from the untreated group.

16. The computer system of claim 15, wherein the running and generating steps comprise encoding any categorical features into a list of binary values.

17. The computer system of claim 16, wherein the generating step further comprises assigning to the single index new customer a value for each categorical feature consisting of the binary value that received the highest weighted average.

18. The computer system of claim 14, wherein the untreated group comprises individual customers receiving a plurality of different customer experiences, the system further operable to:

use the one or more optimizers to construct a digital twin for each of the plurality of different customer experiences in the untreated group for each customer in the treated group; and compare outcomes between customers in the treated group and their digital twins in each of the plurality of different customer experiences to determine the lift measure of the causal impact of the predefined customer experience, compared to each of the different customer experiences, on the outcomes for customers receiving the predefined customer experience.

19. The computer system of claim 14, wherein the features comprise data about individual customer's profiles, behaviors, or their financial outcomes prior to and after a customer experience.

* * * * *